United States Patent
Loza

(10) Patent No.: US 10,427,551 B1
(45) Date of Patent: Oct. 1, 2019

(54) VEHICLE SEAT CONVERSION APPARATUS AND METHOD

(71) Applicant: Miguel Loza, Orange, CA (US)

(72) Inventor: Miguel Loza, Orange, CA (US)

(*) Notice: Subject to any disclaimer, the term of this patent is extended or adjusted under 35 U.S.C. 154(b) by 0 days.

(21) Appl. No.: 15/406,480

(22) Filed: Jan. 13, 2017

Related U.S. Application Data

(60) Provisional application No. 62/375,384, filed on Aug. 15, 2016.

(51) Int. Cl.
*B60N 2/015* (2006.01)
*B60N 2/24* (2006.01)

(52) U.S. Cl.
CPC .............. *B60N 2/015* (2013.01); *B60N 2/24* (2013.01)

(58) Field of Classification Search
CPC ...... B60N 2/015; B60N 2/24; B60N 2/01508; B60N 2/0155; B60N 2/01541; B60N 2/01583
See application file for complete search history.

(56) References Cited

U.S. PATENT DOCUMENTS

| | | | | |
|---|---|---|---|---|
| 4,805,952 A | * | 2/1989 | Coleman | B60N 2/01541 248/503.1 |
| 5,244,178 A | * | 9/1993 | Stewart | B60N 2/005 248/300 |
| 5,443,239 A | * | 8/1995 | Laporte | B60N 2/01583 248/503.1 |
| 5,520,357 A | | 5/1996 | Payne | |
| 5,529,376 A | * | 6/1996 | Jovan | B60N 2/015 297/188.07 |
| 5,890,768 A | * | 4/1999 | Beurteaux | B63B 29/06 244/122 R |
| 6,056,346 A | | 5/2000 | Smuk | |
| 6,145,910 A | * | 11/2000 | Baldas | B60N 2/01583 248/503.1 |
| 6,260,813 B1 | | 7/2001 | Whitcomb | |
| 7,370,832 B2 | | 5/2008 | Frantz | |
| 7,837,145 B2 | | 11/2010 | Wodak | |
| 2004/0174037 A1 | | 9/2004 | Frazier | |
| 2007/0216187 A1 | * | 9/2007 | Hyde | B60N 2/015 296/64 |

(Continued)

FOREIGN PATENT DOCUMENTS

FR 2775227 8/1999

OTHER PUBLICATIONS

Wayback machine archive showing Kroymander article page first published on Dec. 26, 2012, https://web.archive.org/web/20121226211705/http://www.instructables.com:80/id/How-to-make-a-custom-seat-bracket-for-your-car/?ALLSTEPS (last accessed on Sep. 25, 2018) (Year: 2012).*

(Continued)

*Primary Examiner* — Theodore V Adamos
(74) *Attorney, Agent, or Firm* — Lawrence S. Cohen; Brian Billett

(57) ABSTRACT

An assembly called an adapter base allows for replacement of an original equipment seat with a non-original equipment seat in a vehicle by reuse of original equipment seat legs with horizontally oriented fasteners to a non-original equipment seat configured for vertical oriented fasteners. The method involves removing the original seat to make the original equipment seat legs then available for attachment to an adapter base which allows for secure installation of non-original seats in various configurations.

12 Claims, 47 Drawing Sheets

(56) References Cited

U.S. PATENT DOCUMENTS

| | | | | |
|---|---|---|---|---|
| 2011/0241391 A1* | 10/2011 | Lamparter | ............... | B60N 2/24 |
| | | | | 297/216.1 |
| 2015/0136938 A1* | 5/2015 | Kondo | ................... | B60N 2/502 |
| | | | | 248/573 |
| 2015/0143674 A1 | 5/2015 | Maurice | | |
| 2016/0152281 A1* | 6/2016 | Hansen | .............. | B60N 2/01516 |
| | | | | 296/193.07 |
| 2016/0159402 A1* | 6/2016 | Nakaya | .................. | B62D 25/20 |
| | | | | 296/193.02 |
| 2016/0200221 A1* | 7/2016 | Perlo | .................... | B62D 23/005 |
| | | | | 296/193.02 |
| 2016/0347205 A1* | 12/2016 | Cardone | ................ | B60N 2/015 |

OTHER PUBLICATIONS

Wayback machine archive showing Tom's Bronco Parts page first published on Jun. 14, 2015, https://web.archive.org/web/20150614095650/https://www.tomsbroncoparts.com/pages/schematics/bronco-schematics/1996-ford-bronco-custom-aftermarket-front-seat-installation/ (last accessed on Sep. 25, 2018) (Year: 2015).*

Wayback machine archive of DiscountVanTruck.com page to show publication as of May 1, 2015, https://web.archive.org/web/20150501222701/http://www.discountvantruck.com/discounttransitaccessories/transit.htm (last accessed on Sep. 25, 2018 (Year: 2015).*

Tom's Bronco Parts, 1996 Ford Bronco Custom Aftermarket Front Seat Installation, https://www.tomsbroncoparts.com/pages/schematics/bronco-schematics/1996-ford-bronco-custom-aftermarket-front-seat-installation/ (last accessed on Sep. 25, 2018) (Year: 2018).*

Kroymander, How to Make a Custom Seat Bracket for Your Car, https://www.instructables.com/id/How-to-make-a-custom-seat-bracket-for-your-car/ (last accessed on Sep. 25, 2018) (Year: 2018).*

DiscountVanTruck.com, Your Transit Van Discount Accessory Store, http://www.discountvantruck.com/discounttransitaccessories/transit.htm (last accessed on Sep. 25, 2018) (Year: 2018).*

Wikipedia, Original Equipment Manufacturer, https://en.wikipedia.org/wiki/Original_equipment_manufacturer#Automotive_parts (last accessed on Apr. 29, 2019) (Year: 2019).

Wright, M., What Does OEM Mean?, https://www.thoughtco.com/what-does-oem-mean-281284 (last update on Oct. 1, 2018) (Year: 2018).

Machine translation of foreign reference FR2775227, obtained from http://translationportal.epo.org/emtp/translate/?ACTION=description-retrieval&COUNTRY=FR&ENGINE=google&FORMAT=docdb&KIND=A1&LOCALE=en_EP&NUMBER=2775227&OPS=ops.epo.org/3.2&SRCLANG=fr&TRGLANG=en (last accessed on Dec. 20, 2018) (Year: 2018).

* cited by examiner

Base Number 6205

Base Number 6301

VEHICLE SEAT CONVERSION APPARATUS AND METHOD

RELATED APPLICATIONS

The benefit is claimed of provisional application No. 62/375,384 filed on 15 Aug. 2016.

FIELD OF THE INVENTION

The invention relates to vehicle seating, in particular for apparatus and system for allowing a seat supplied by the Original Equipment Manufacturer (OEM) to be removed and replaced by a non-OEM seat. Most commonly the vehicle is a van.

BACKGROUND

Seat replacement in vehicles is generally performed for the purpose of upgrading original seating for comfort or quality or for reconfiguring the placement of seats. In addition, seat replacement is performed to increase the capacity of seating in vehicles such as commuter vans. It may also be done to provide for a specific use of a van, sport utility vehicle, bus or mini-van or for a racing conversion. The most common process for mounting replacement seats which are not original equipment in vans is to mount the seats through the floor of the vehicle. This typically requires a customized procedure that does not engage any of the seat mounting structures from the OEM seating. A primary challenge is to mount the replacement seats with sufficient strength and durability for safety and long term use. The replacement seats (non-OEM or after-market) are a complete customization with little or no re-use of the original equipment. The design and installation of replacement seats is often done in a "shop" environment with little or no quality or qualified engineering attention. In exemplary methods, mounting replacement seats requires drilling bolt holes through the van floor, although existing holes may be used, and strengthening members attached above the floor and mounting brackets below the floor to provide the intended strength and rigidity. This results in high cost and substantial risk such as dislodgment of the new seat in any collision or other traumatic event or even in rough use.

This is contrasted to the quality design and production automotive engineering and testing that original seating design undergoes including testing by crash tests to ensure reliability for passenger safety.

DETAILED DESCRIPTION

Figure 1A:
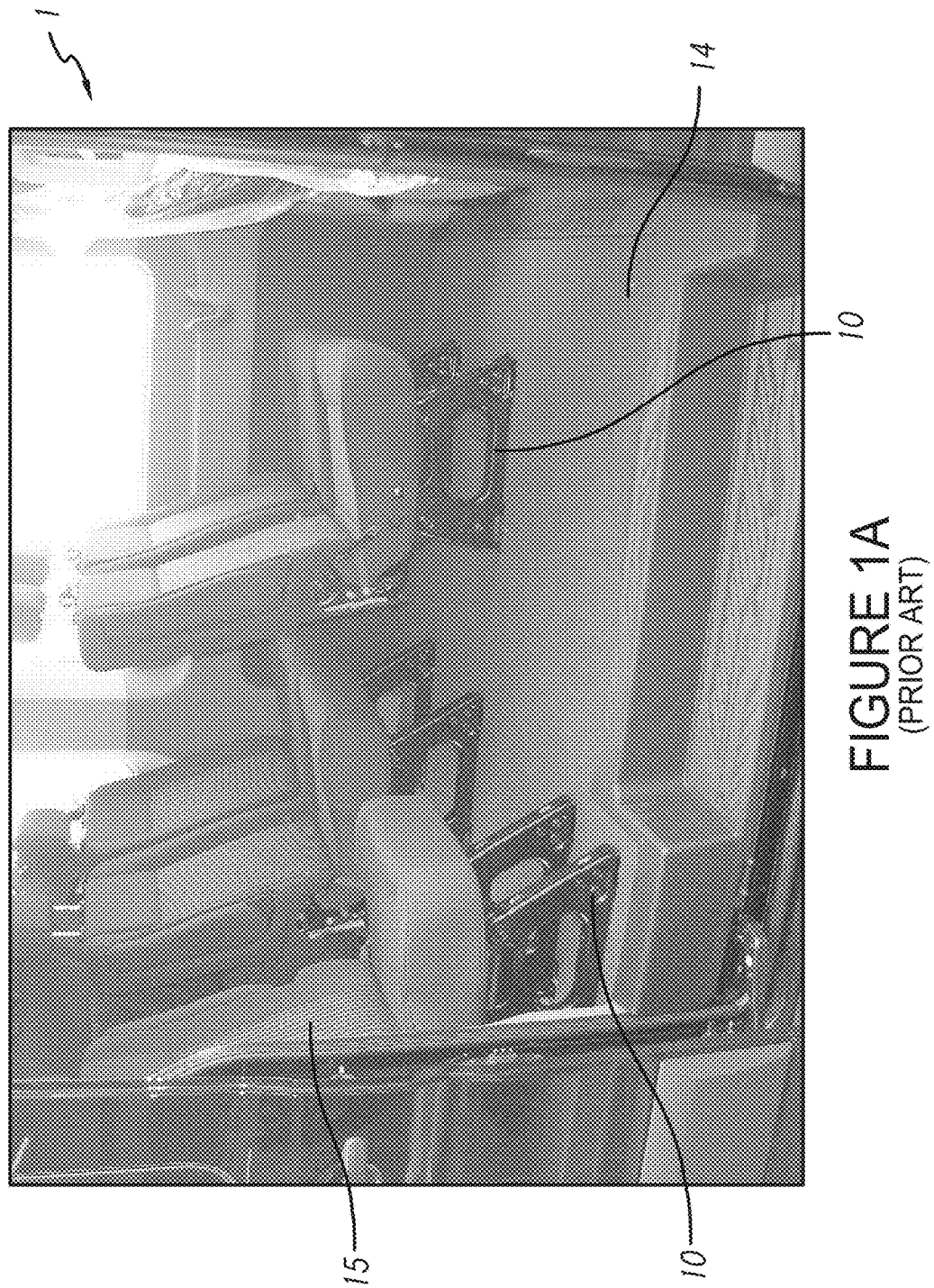
FIGS. 1A and 1B are prior art showing exemplary OEM seating in a 2016 Ford Transit T150 as fixed to the vehicle.

The present invention relates to apparatus and methods for replacing Original Equipment Manufacturer (OEM) seats in a vehicle. Most commonly the seat replacement is done in a van. It is typically but not necessarily, that the existing seat is the OEM seat and that the replacement seat is customized for providing levels of upgraded comfort or specialized seating capacity or arrangement.

The invention is based on the realization that the design and installation of the OEM seats is based on high levels of engineering such as for manufacture of large numbers of vehicles and to ensure strong safety and durability such as from a major automotive manufacturer. This is compared with the "workshop" level of design and workmanship that could evolve in a seat replacement shop.

Specifically, the invention is based on the realization that certain vehicles have OEM seating legs which may be left in place or reinstalled upon removal of the original seat and with use of a transition member, referred to herein as an adapter base, are capable of supporting a non-OEM seat construction which would otherwise have required substantial modifications to the floor and structural mounting members affixed to the vehicle floor. The invention works when the original seat, the OEM seats, has legs that are fitted securely to the floor of the van and the original seat is removably attached to the leg(s). In such case then, the seat leg and the securing structure and the floor of the OEM vehicle are retained and the replacement seat is fixed in place by way of an adapter base that attaches to the OEM seat leg and to the replacement seat. The present apparatus and method implements a configuration of an adapter base member that acts to allow transition to a new seat to take the place of a removed seat yet using the OEM seat legs and the OEM floor structure for attachment of the OEM seat legs.

More specifically, OEM seat legs including the existing means of attachment of the OEM seat legs to the OEM seat and of the seat legs to the OEM vehicle floor structure becomes available for use with a replacement seat. As will also be understood, by using the OEM seat legs the entire structure of the OEM vehicle floor and its attachment means to the OEM seat legs is available for use. However if the replacement seat is not an OEM seat, it may not be able to attach directly to the OEM legs. Thus the transition structure, the adapter base is required which can attach to the legs and can attach to the replacement non-OEM seat or seats. Because the replacement or otherwise non-OEM seating can have a variety of configurations, the adapter base is designed to have readily available configuration variations both for the OEM seat leg positions to which it will attach and to the seating arrangement. As will be understood, the term seating arrangement comprises single seats, multiple seats and auxiliary accommodations such as a tray or a console.

With the availability of the OEM seat legs in specific van models, the adapter base is then configured along with attachment structure to the new seating arrangement to provide secure and easily installed new seating. The adapter base in one embodiment has been designed so that its basic configuration works for all seating arrangements embodiments by simple variations. In some cases this simply means that a particular adapter base construction can satisfy several seating arrangements only that holes be drilled in it to meet different seating arrangement fastening requirements. In other cases certain members are varied in length to meet different seating arrangements.

For convenience of understanding, in this description, the orientation of the van is defined as having an axial direction, which is from front to back (and vice versa) and a transverse or lateral direction which is across the width of the van and being at right angle (to the left and right) to the axial direction.

The invention is based on three connection configurations. The first is with respect to the OEM seat legs (sometimes simply referred to as seat legs or legs). In the OEM condition, the legs come mounted to the van floor by means which includes a fixed hook and a hinged latch on the leg which connect to floor latch points that are spaced apart axially. The seat legs are also connected to the OEM seats, typically by bolt and nut fasteners. To remove the OEM seat it is appreciated that it is possible to simply detach the OEM seat from the seat leg while leaving the seat leg attached to the floor. However this is an awkward process. More conveniently, the OEM seats may be relatively easily removed by releasing the seat legs from the floor attachment so that the seat and the legs are removed together. The OEM seats may be readily disconnected from the legs by disconnecting the seat from axially spaced apart seat connection points on the legs. In the particular van embodiments described herein the floor latch points are fixed bar structures affixed to axially extending struts built into the vehicle floor. Embodiments of the adapter base in the present invention are designed to have available forward transversely (laterally) spaced apart connection points and rear transversely (laterally) spaced apart connection points for attachment to the OEM legs and to the replacement seats. With this consistent configuration of connection points, both to the legs and to the replacement seat or seats, the adapter base may be configured with a general repeatable structure for each of the two connections, to the legs and to the seat(s). In a specific embodiment the adapter base is made as an assembly having axially extending bars spaced apart to connect to the legs at the same connection points at which the OEM seat had been attached. In this way the legs can be attached to the floor of the van the same way that they were allowed to attach originally. In a specific embodiment, the adapter base also has as part of its assembly transversely extending bars which have spaced-apart connection points to connect to transversely spaced-apart connection points of the seat. In that respect, there is a forward transversely extending bar that aligns to the forward transversely (laterally) spaced apart connection points of the new seat and a rear transversely extending bar that aligns to the rear transversely (laterally) spaced apart attachment points of the new seat.

A relatively simple general design is disclosed herein to allow such replacement over a wide variety of existing seat leg configurations as well as a wide variety of replacement seat structures. That is the OEM layout of the seat arrangement is varied and that variation is fixed by the allowed seat leg positions. As will be seen however an increased variety of seat arrangements can be accomplished with the present invention despite the seat leg attachments to the floor be fixed as in the OEM construction.

In the most basic form a single seat is replaced by another single seat. But it is frequently the case that two seats are adjacent to each other. In such a configuration there would be three legs. The adapter base would extend across all three legs and be attached to all three legs, and the seat connecting structure of the adapter base will be arranged to hold the two seats. Similarly, it is possible to adapt the inventive concept for a row of three seats. Beyond that, virtually any number of adjacent seats can be easily taken care of with the adapter base structures, each of the leg fitting structure and the seat fitting structure being simply made to accept as many legs and seats, respectively as in the row.

In the more detailed description following, there will be described several varied embodiments of the invention. In one such set of variations is the structure of a single seat, a seat with a console or a tray, a double seat and a triple seat.

An embodiment of application of the invention is exemplified by the 2016 Ford Transit T150 and the 2016 Ford Transit T350. These will be referred to as the T150 and the T350 respectively.

Now, with reference to the accompanying drawings, the full description of exemplary embodiments follows.

Figure 1B:
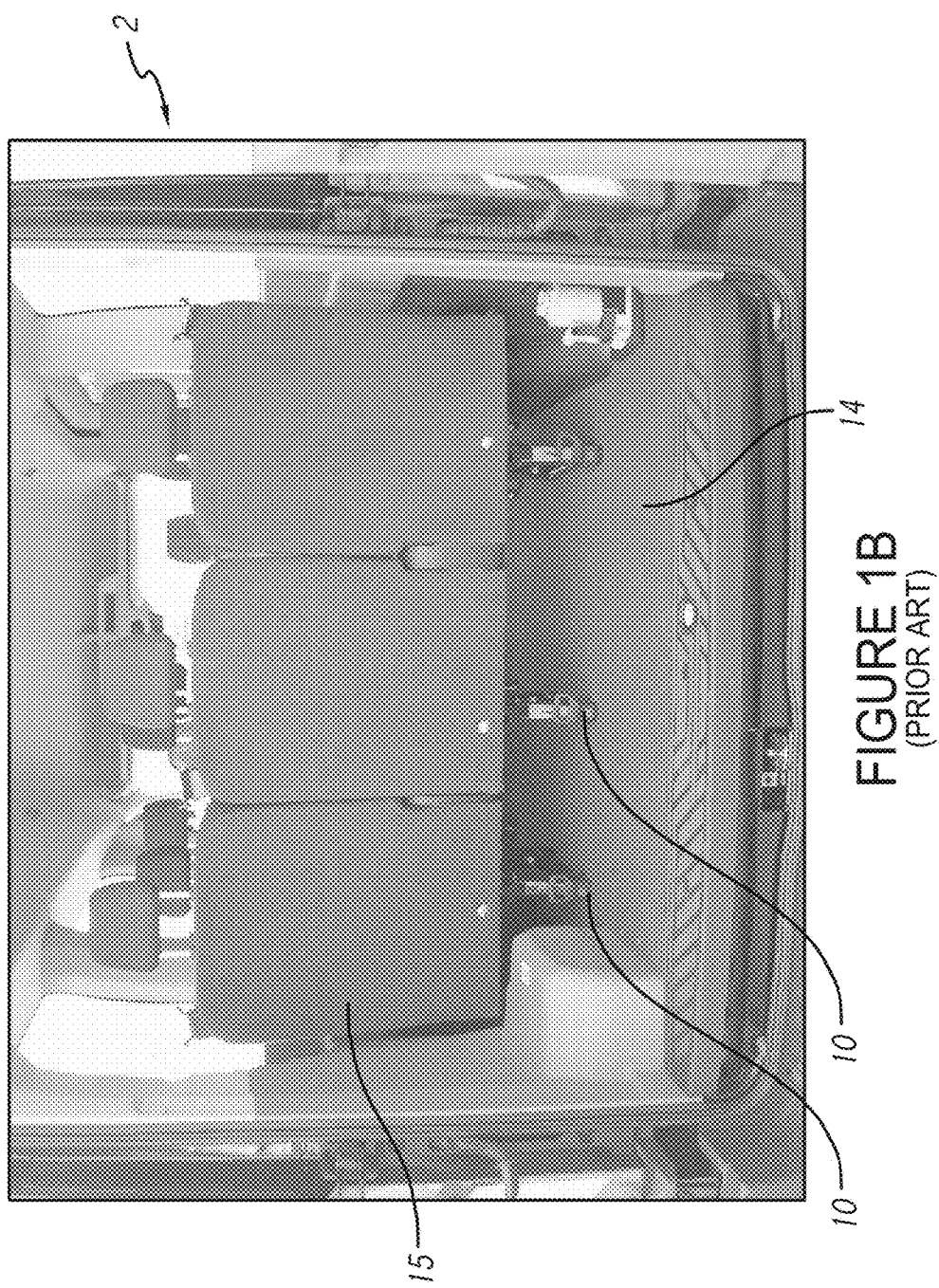

Referring to FIGS. 1A and 1B, an OEM seating configuration is shown for the 2016 Ford Transit T150 van interior the side view FIG. 1A and the rear view FIG. 1B, in which the OEM seats 15 are supported and attached to the van floor by OEM seat legs 10. These seat legs 10 are removably attached to the shown OEM seats 15 and can be detached from and reattached to the vehicle floor 14 as detailed below by a fixed hook and hinged latches on the seat legs (see FIG. 3A) connecting to the OEM attachment points fixed on the vehicle floor 14 (see FIG. 3B).

Figure 2A:
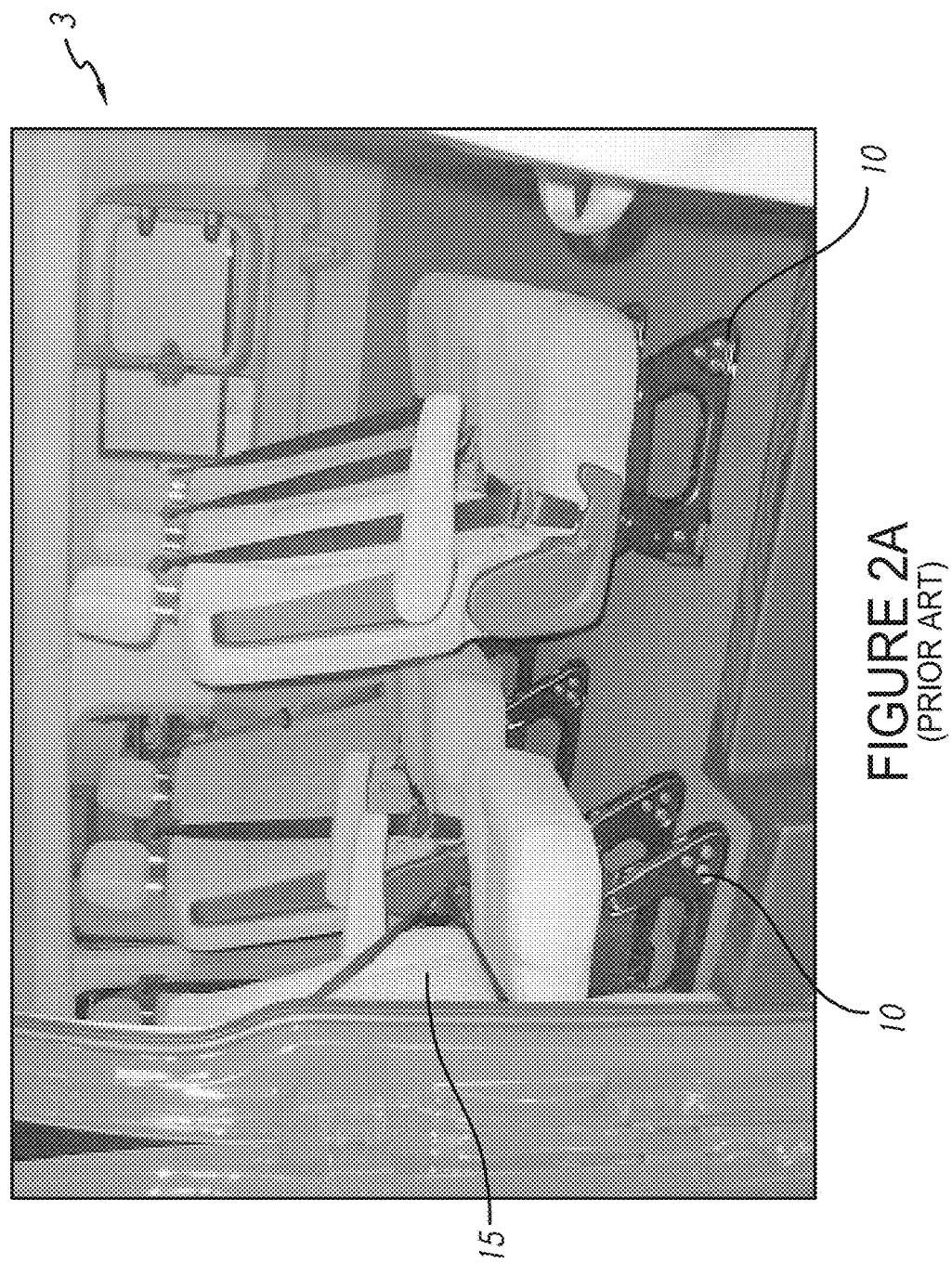
FIGS. 2A and 2B are prior art showing exemplary OEM seating in a 2016 Ford Transit T350 as fixed to the vehicle.
Figure 2B:
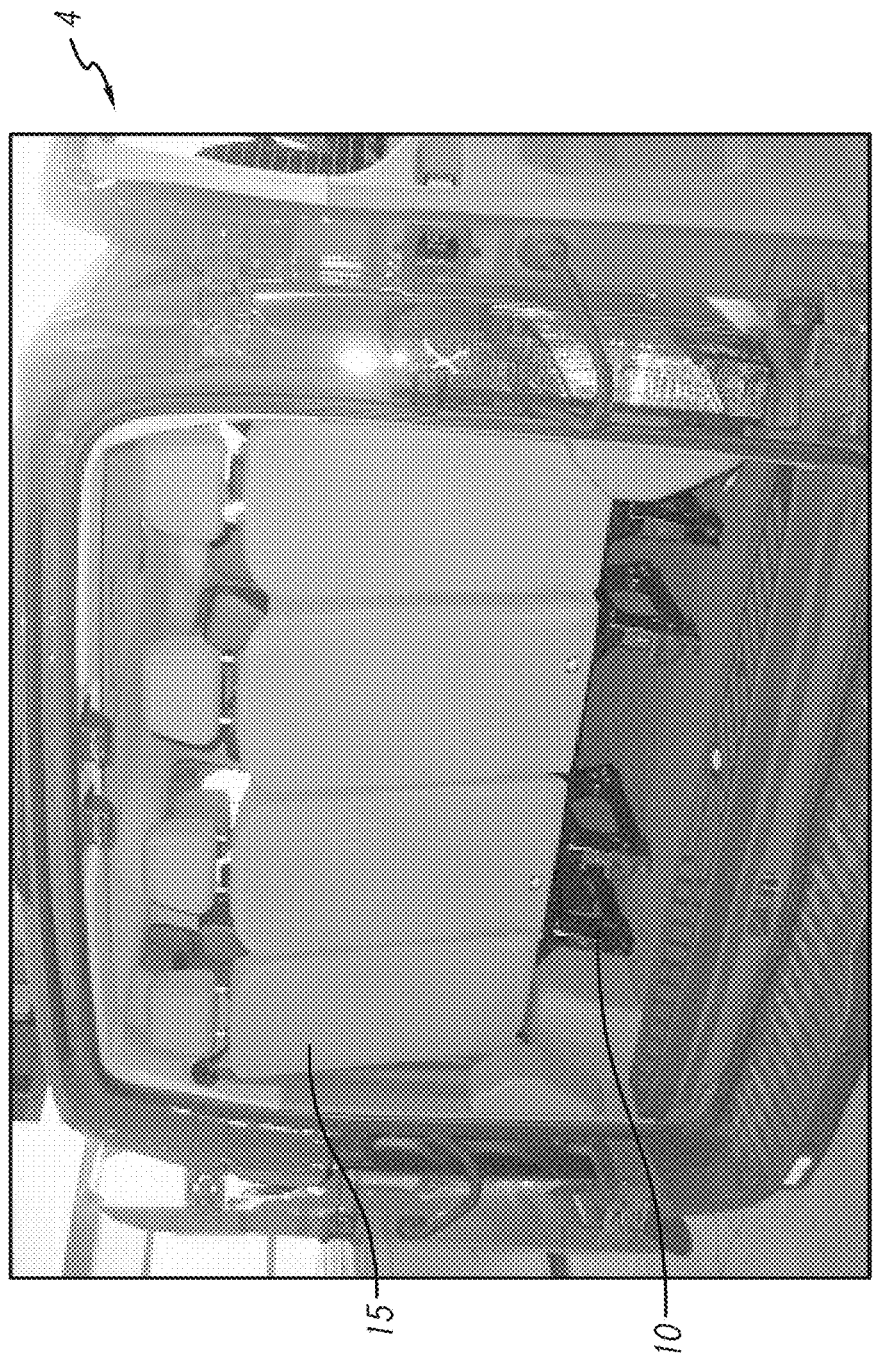

Referring to FIGS. 2A and 2B, an OEM seating configuration is shown for the 2016 Ford Transit T350 van interior the side view FIG. 2A and the rear view FIG. 2B which has OEM seat legs 10 of the same relevant structure as the T150, that is that they can be detached from the OEM seat 15 and may be detached from and reattached to the van floor 14.

Figure 3A:
FIG. 3A is prior art showing a photograph of the lower portion of the OEM seat leg.
Figure 3B:
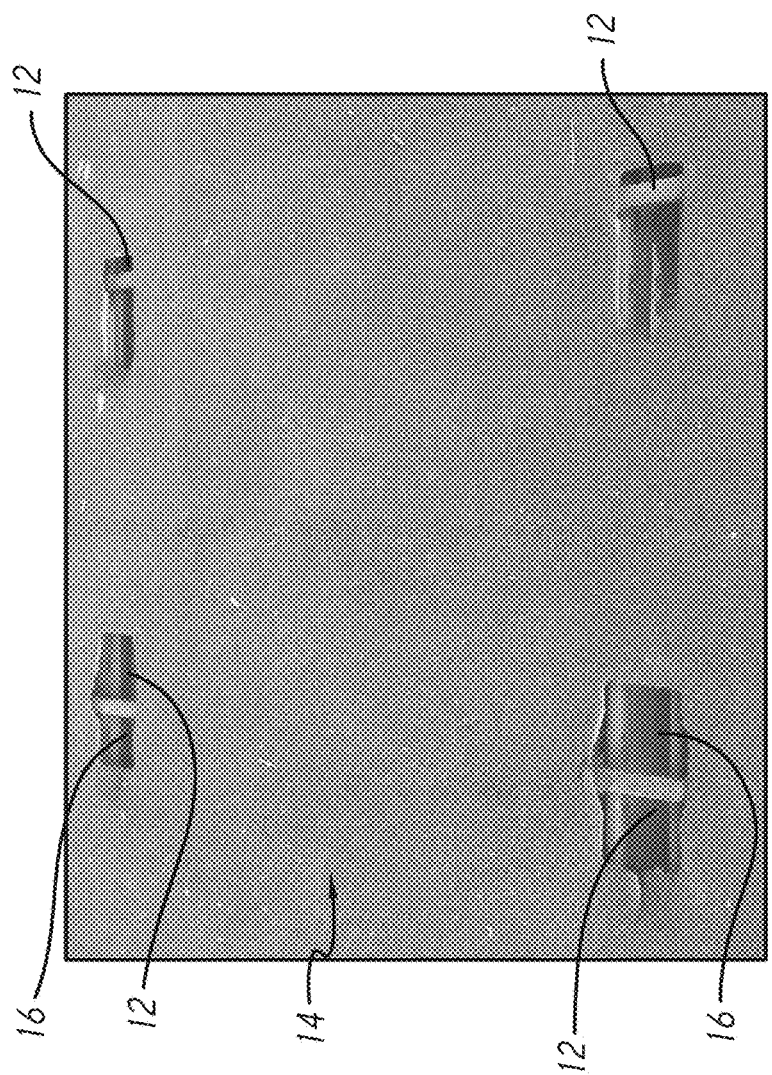
FIG. 3B is prior art showing a partial photograph of the floor of the Ford Transit T150 and of the Ford Transit T350.

FIG. 3A shows a photograph of the OEM seat leg 10 which is exemplary of the seat leg for each of the T150 and T350 having a fixed hook 11A and a hinged latch 11B (which is also understood to effectively be a hook albeit mechanically built for attachment and release). FIG. 3B is a partial view of a floor of the T150 and T350 showing fixed cross-bars 12 (also called receiver bars) which are attached to axially-extending struts 16 built into the vehicle floor 14 (actually the Fig. shows the carpet, the floor of the van being under the carpet).

The seat hook structures 11A and 11B shown in FIG. 3A are attached to the fixed cross-bars 12 which are affixed to the vehicle floor 14 shown in the photograph FIG. 3B. The axially extending struts 16 and the fixed cross-bars 12 being part of the OEM floor structure and along with the OEM seat legs 10 provides assurance that the robust OEM level of design and construction is retained. In other embodiments, the OEM seat leg 10 structures can affixed or connected to the vehicle floor 14 by other means, such as a bolt/nut combination fastener, however in such cases there is required careful design and engineering to both be of sufficient strength and also full compliance with attachment to the legs 10.

Figure 3C:
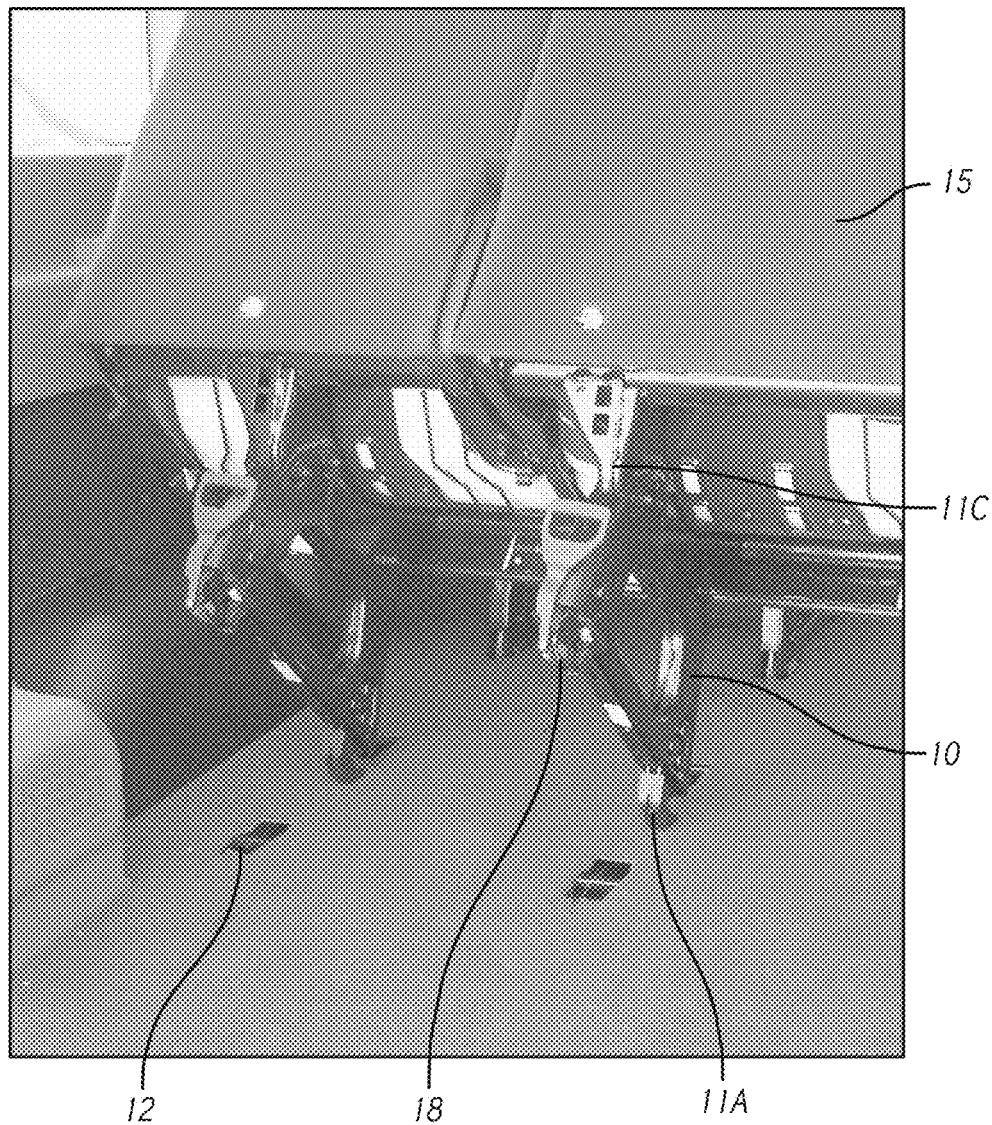
FIG. 3C is prior art showing an OEM seat and seat legs with fixed hook and hinged latch structures during removal from a vehicle.
Figure 3D:
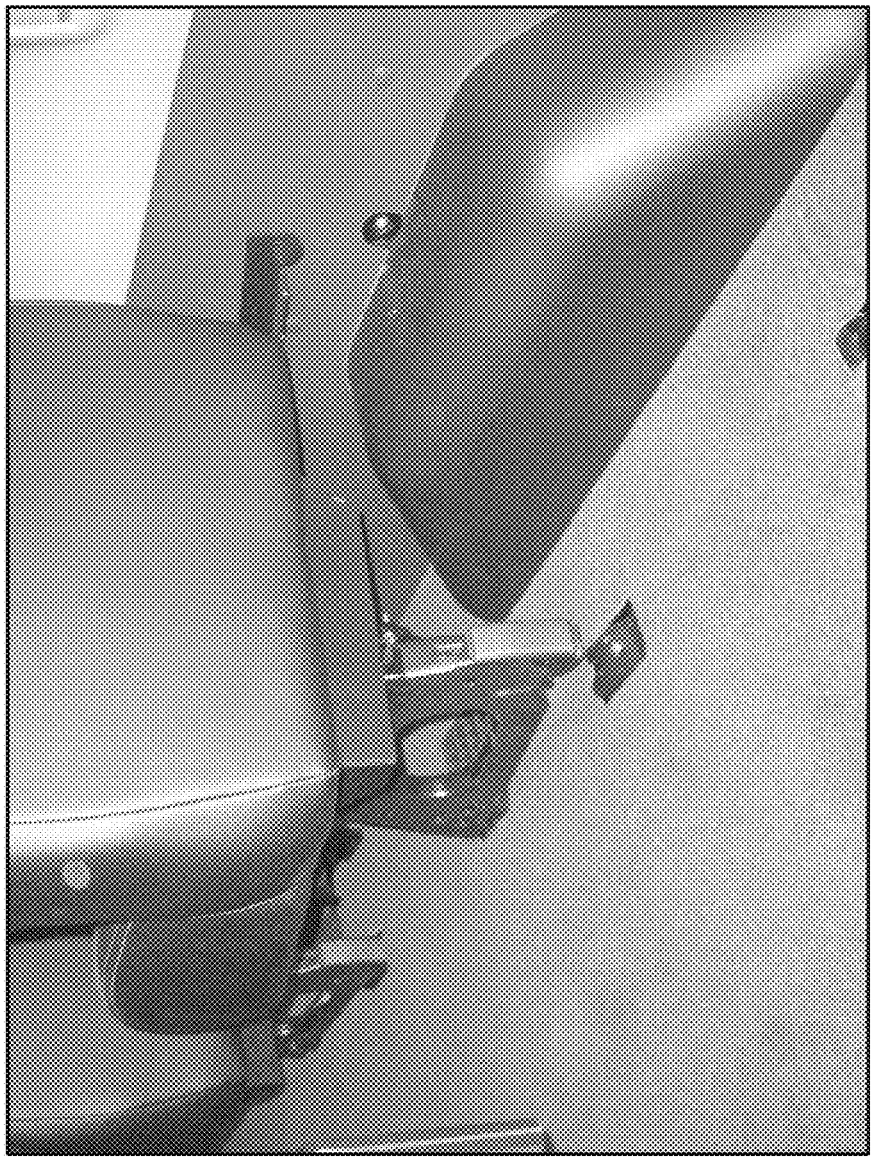
FIG. 3D is prior art showing that certain OEM seats have only one seat leg.

FIG. 3C shows the rear seats 15 of a T150 or a T350 in the process of being removed (actually the photo is of the T150, however for the T350 it is the same procedure). Shown structures for the OEM seat legs 10 are the fixed hook 11A and hinged latch 11B. The OEM seat leg 10 is attached to the OEM seat 15 by a vertical mounting bracket 11C which is permanently affixed to the OEM seats and attaches to the seat legs 10 by nut/bolt fastener combinations (not shown). The fixed cross-bars 12 are available for receiving the hooks 11A and 11B of the legs 10. This done by disengaging the hinged latches 11B from the cross bars 12 while rotating the entire structure forward. Then by further rotating the structure forward the hooks 11A can be released and the seating arrangement lifted free.

FIG. 3C shows a seat in the T150 that is adjacent to a wheel well and has a seat leg on one side while the other side is fastened to the wheel well.

Figure 15A:
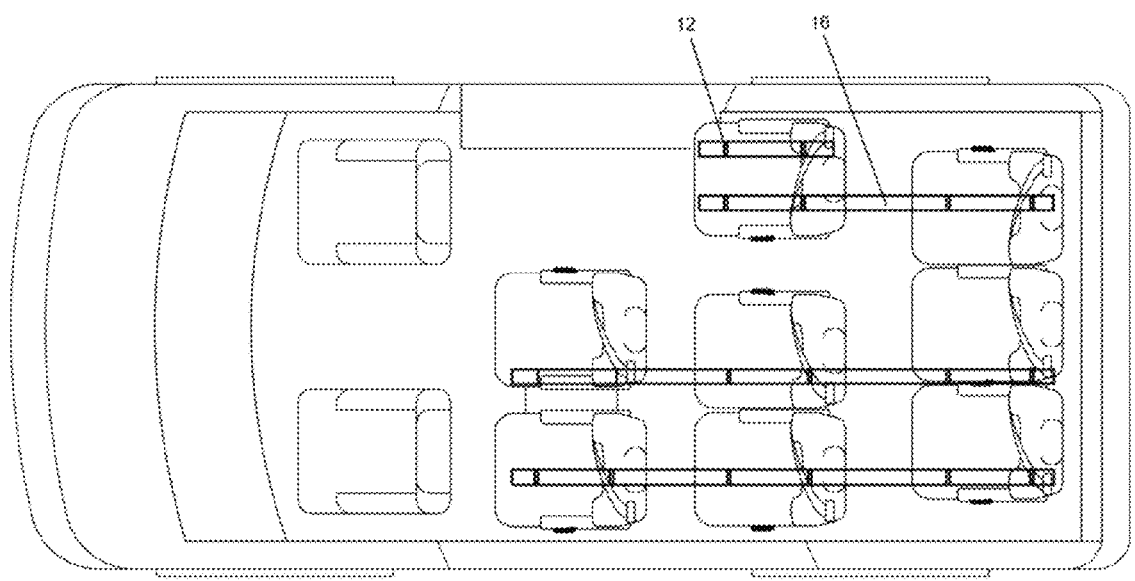
FIGS. 15A-15B show respectively the OEM floor and seating for a T150 and T350 version showing the struts and cross bars built into the floor as OEM.
Figure 15B:
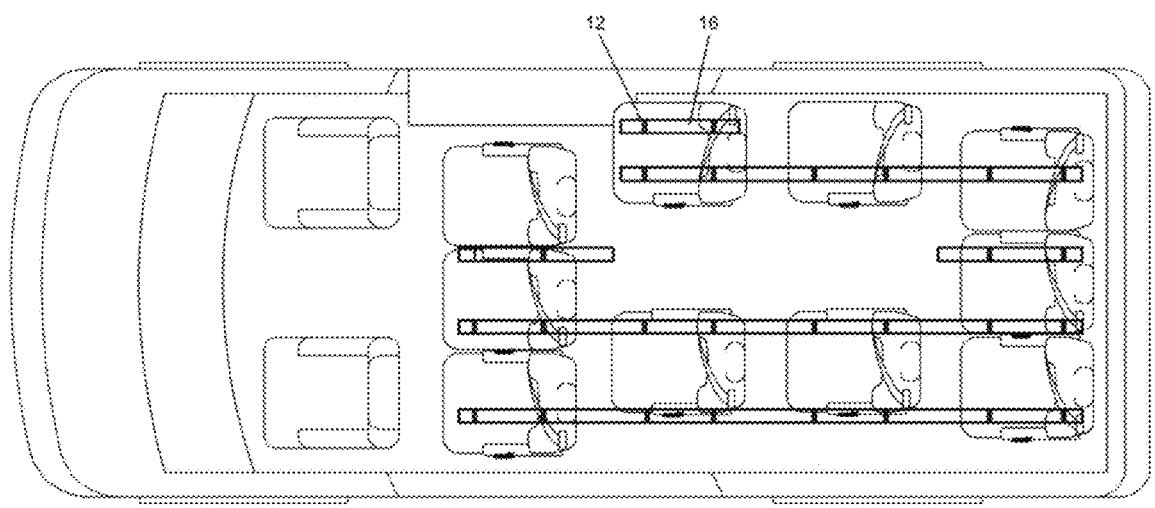

The full arrangement of the van floors for the T150 and T350 are shown in FIGS. 15A and 15B.

Figure 4:
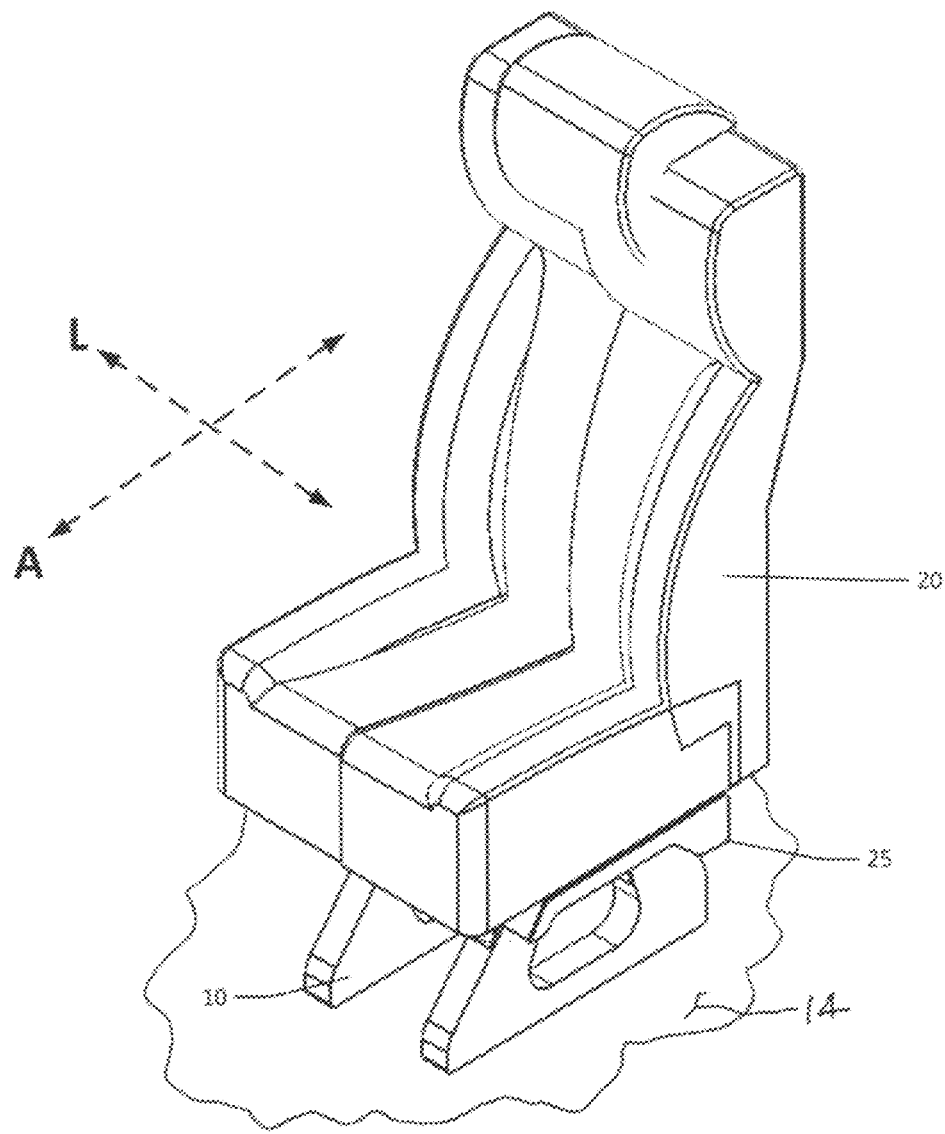
FIG. 4 shows a perspective view of an embodiment of a seat conversion using the adapter base installed with an after-market or non-OEM seat onto OEM seat legs as installed in a van floor. The defined lateral and axial directions are shown with A being the axial direction and L being the lateral direction.

FIG. 4 depicts an overview, a single seat embodiment in which a non-OEM seat 20 (also referred to as a replacement seat) is connected to an adapter base 25, which is in turn connected to the OEM seat legs 10 installed on a van floor 14. For reference clarity, the axial A and lateral L directions are identified. Additional drawings described below depict details and other embodiments of the various components.

Figure 5A:
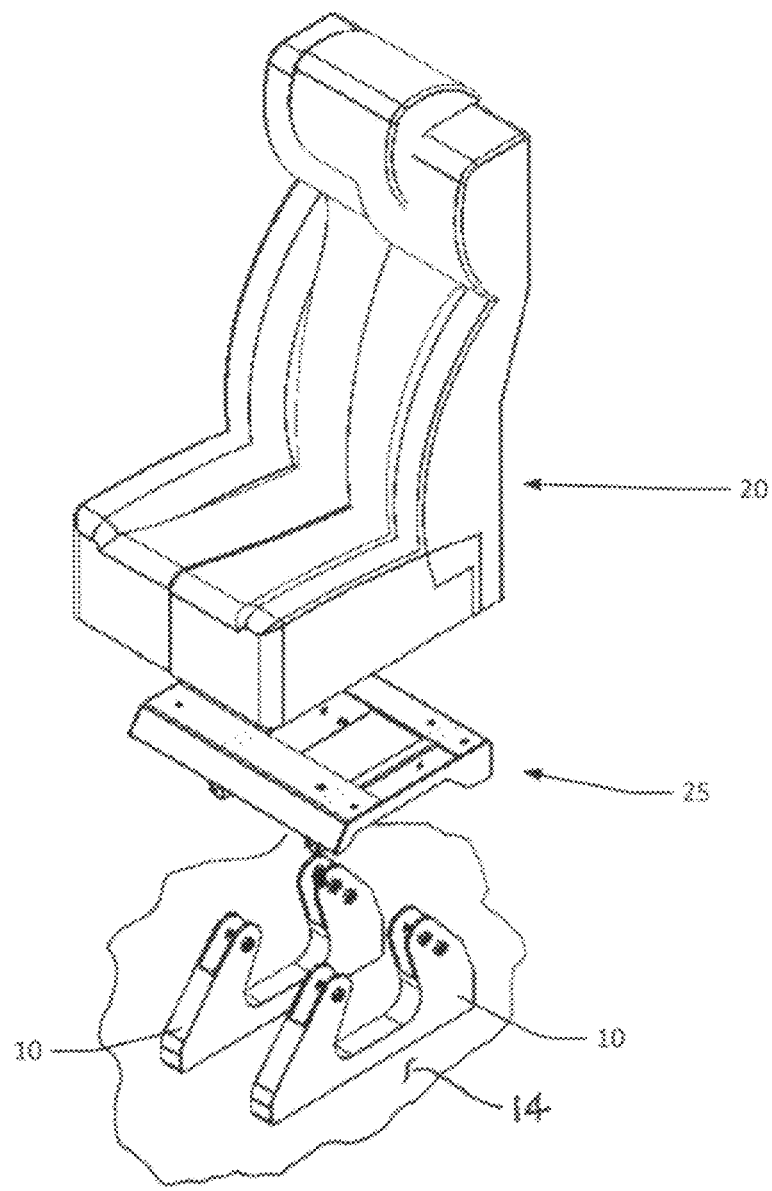
FIG. 5A shows an exploded perspective view of an embodiment as in FIG. 4 of a seat conversion using the adapter base installed with an after-market or non-OEM seat onto OEM seat legs as installed in a van floor.
Figure 5B:
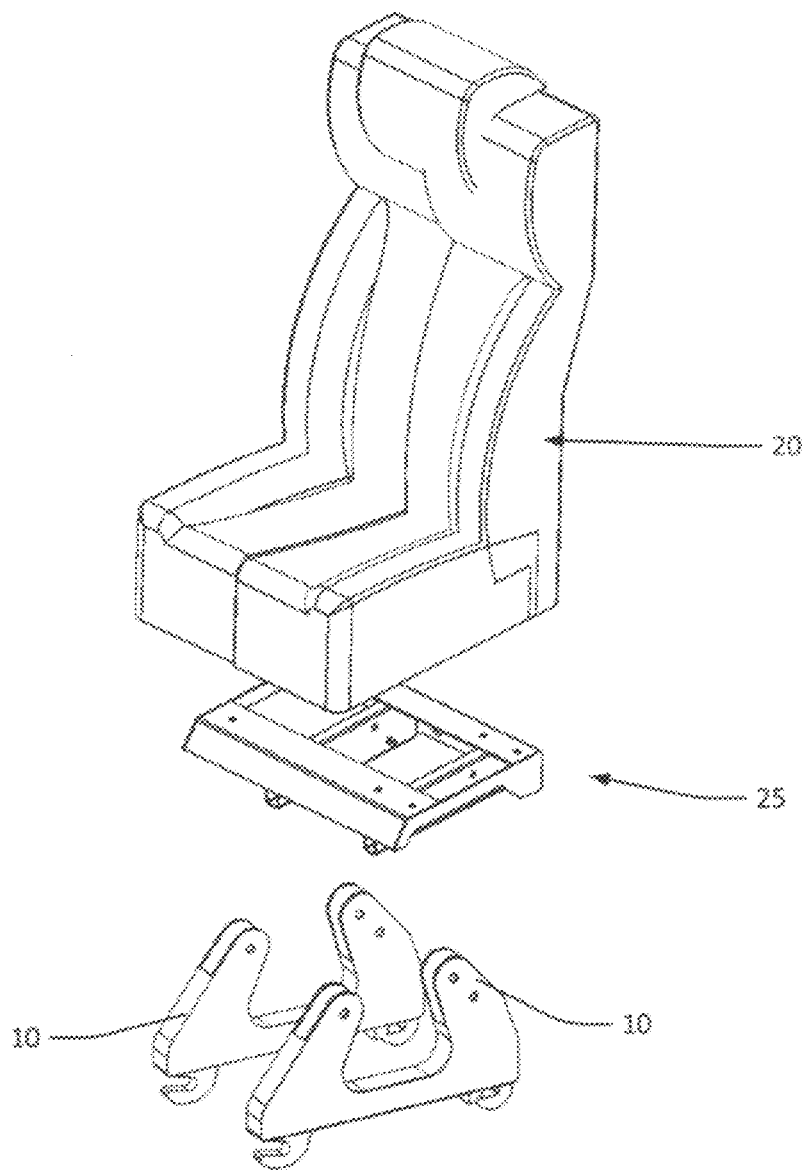
FIG. 5B shows the exploded view of an embodiment as in FIG. 5A of a seat conversion but not installed in a van floor so as to show the OEM seat legs with the hook and hinged latch.

FIG. 5A depicts an exploded view of a single seat conversion embodiment showing the relative positions of the seating components which include the replacement seat 20, the adapter base 25 and the seat legs 10 shown as installed in the floor 14 of the subject van. FIG. 5B depicts the same conversion embodiment as in FIG. 5A except showing it separated from the van floor and showing the hook 11A and the hinged latches 11B.

Figure 6A:
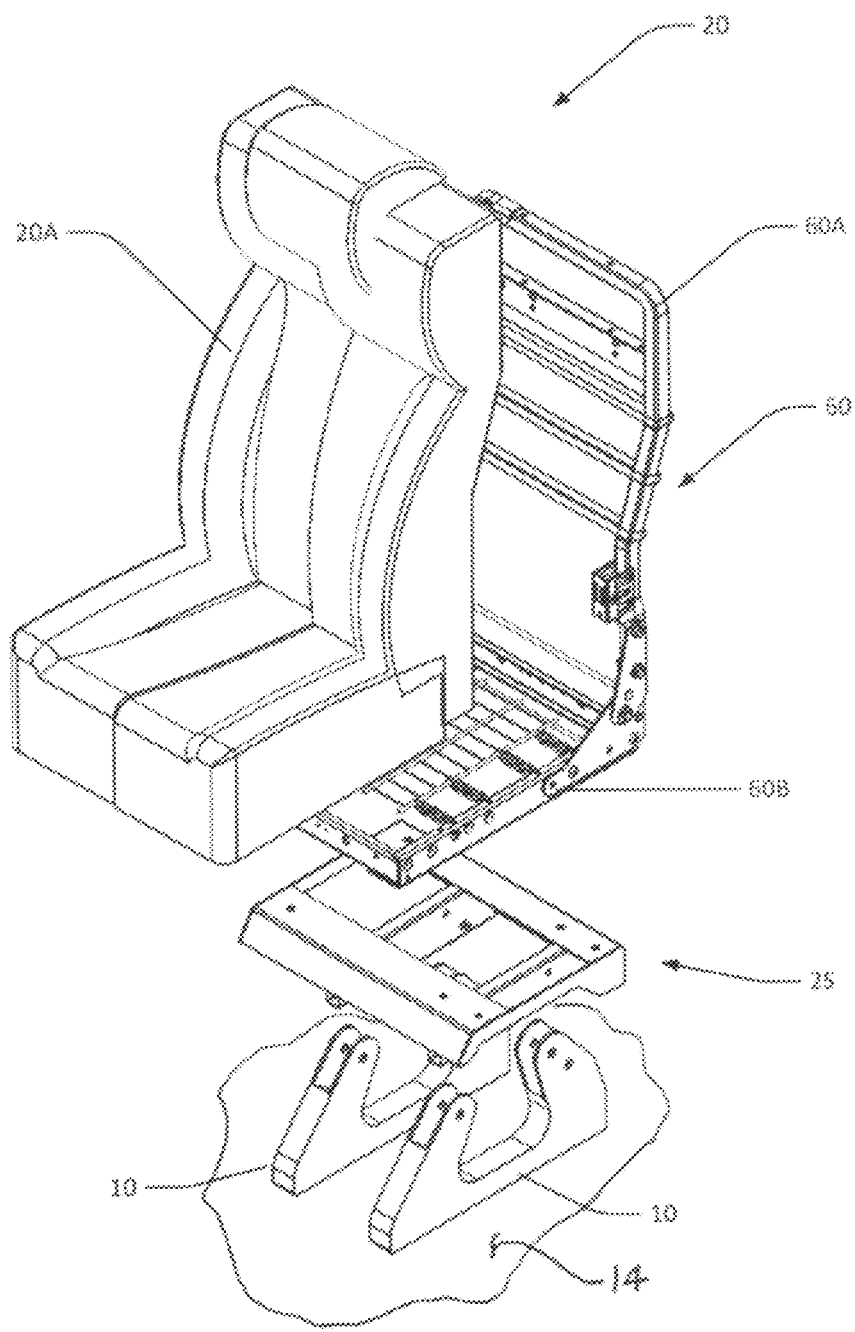
FIG. 6A shows an exploded perspective view of an embodiment of a seat conversion as installed in a van floor using the adapter base installed with an after-market or non-OEM seat onto OEM seat legs. Also shown is the internal seat frame to which the seat cushions and adapter base are attached.
Figure 6B:
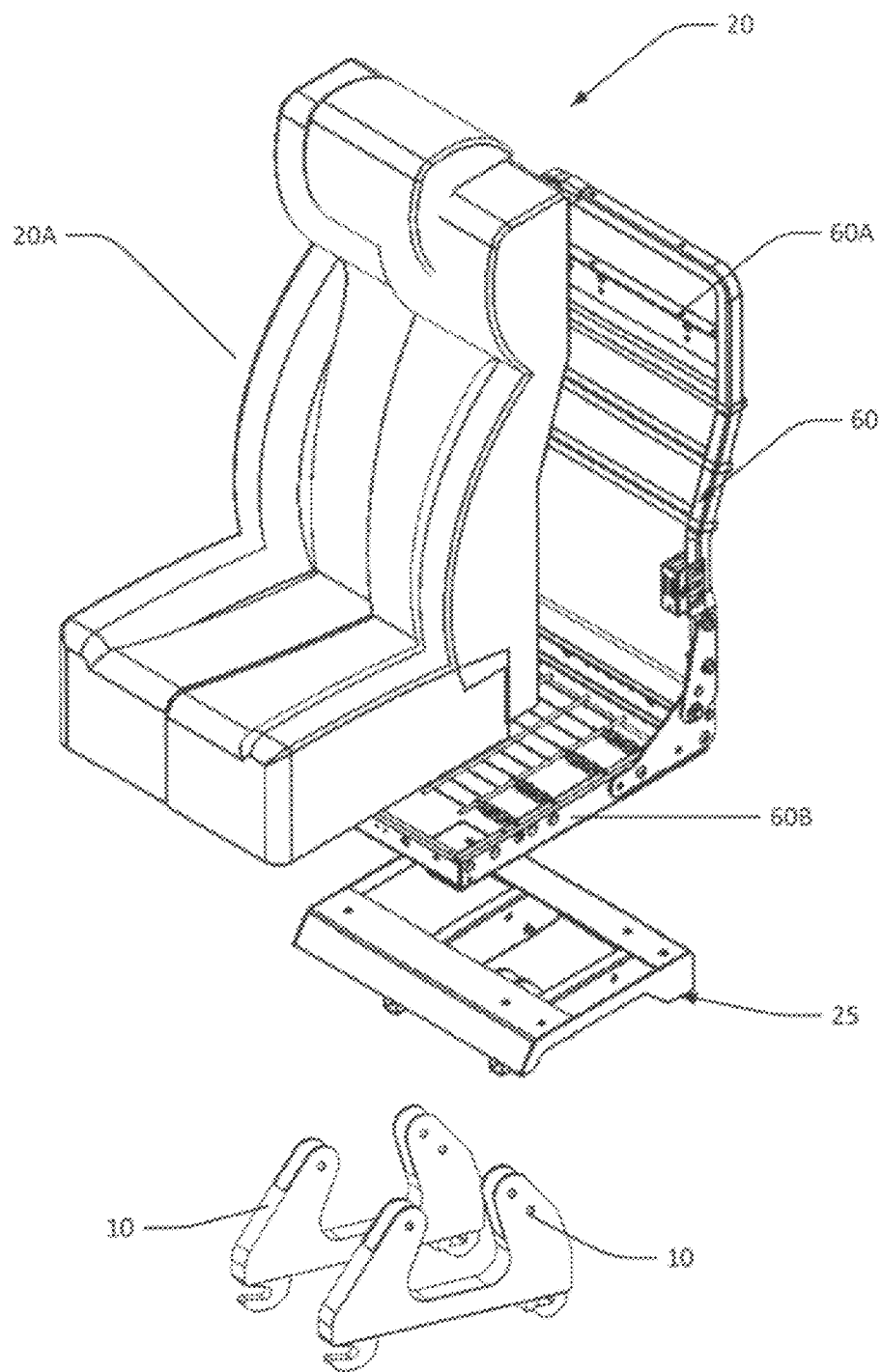
FIG. 6B shows the exploded view of an embodiment as in FIG. 6A of a seat conversion but not installed in a van floor so as to show the OEM seat legs with the hook and hinged latch.

FIG. 6A depicts an overview of a further exploded view of an exemplary single seat conversion embodiment showing the relative positions of the seating components which include the replacement seat 20 exploded to show the replacement upholstered portion 20A, the replacement seat frame 60 including the seat back frame 60A and the seat base frame 60B of the replacement seat frame 60, the adapter base 25 and the OEM seat legs 10 showing it as installed in the floor 14 of the subject van. FIG. 6B depicts the same conversion embodiment as in FIG. 6A except showing it separated from the van floor and showing the hook 11A and the hinged latches 11B.

Figure 7A:
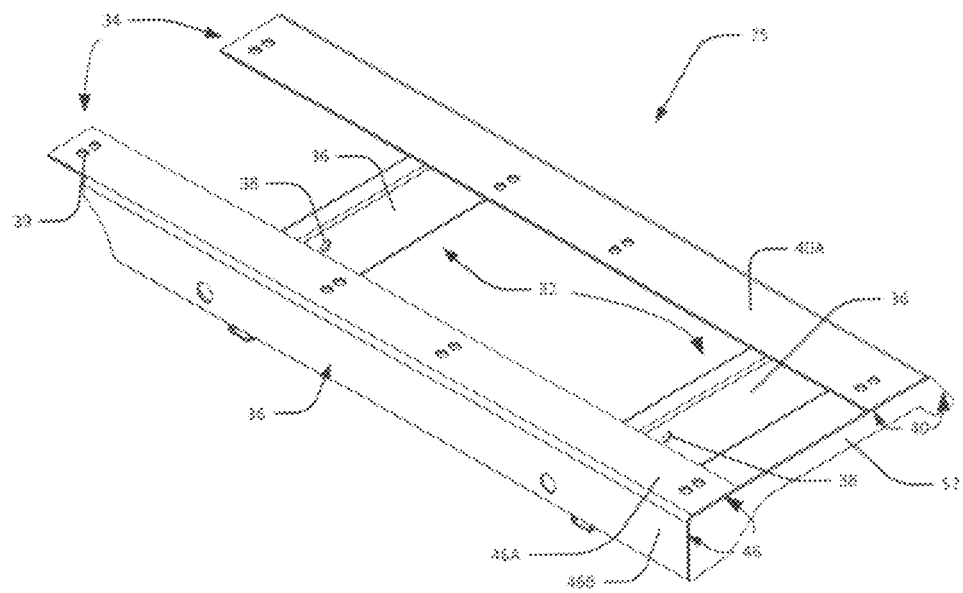
FIGS. 7A and 7B are respectively a perspective view from above and a perspective view from below of an embodiment of the adapter base.
Figure 7B:
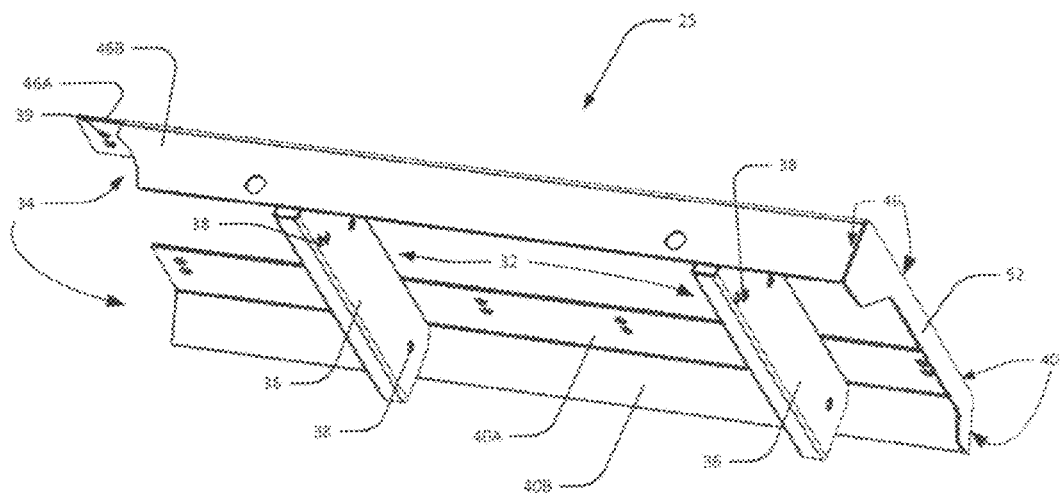

Referring to FIGS. 7A and 7B in an exemplary embodiment there is shown the adapter base 25 which has leg attaching portion 32 and seat attaching portion 34 which are integrally connected. The leg attaching portion 32 comprises a set (in this embodiment, a pair) of spaced apart axially extending beams 36 (which can be hollow or solid, extending axially when installed). The axially extending beams 36 have holes 38 for mounting them to the OEM seat legs 10. The seat attaching portion 34 has a laterally extending forward beam 40 (extending laterally when installed), made up of a forward horizontal planar strut 40A and an angle strut 40B forming an obtuse angle and a laterally extending rear beam 46 made up of a rear horizontal planar strut 46A and a vertical strut 46B forming a right angle. There is also an end strut 52. Holes 39 are placed in a variety of selected locations on the laterally extending forward beam 40 and the laterally extending rear beam 46 to accommodate a variety of non-OEM seat mounting fastener positions as will be further explained below. While the functional portions will be described further below in their application, as can be appreciated the structure may be made other ways so as to provide the needed rigidity, with the primary consistent structure being able to attach to the OEM seat legs 10 by axially extending spaced apart beams and to the replacement seat by laterally extending spaced apart beams. It will be made clear that the configuration of the adapter base presenting the forward beam 40 and the rear beam 46 along with the axial beams 36 present an assembly that can be readily varied for numerous replacement seating arrangements without needing further exacting engineering; but rather by simply making the lateral beams a desired length and putting in the number of axial beams needed to support whatever set of replacement seats are to be on the given adapter base.

Figure 8:
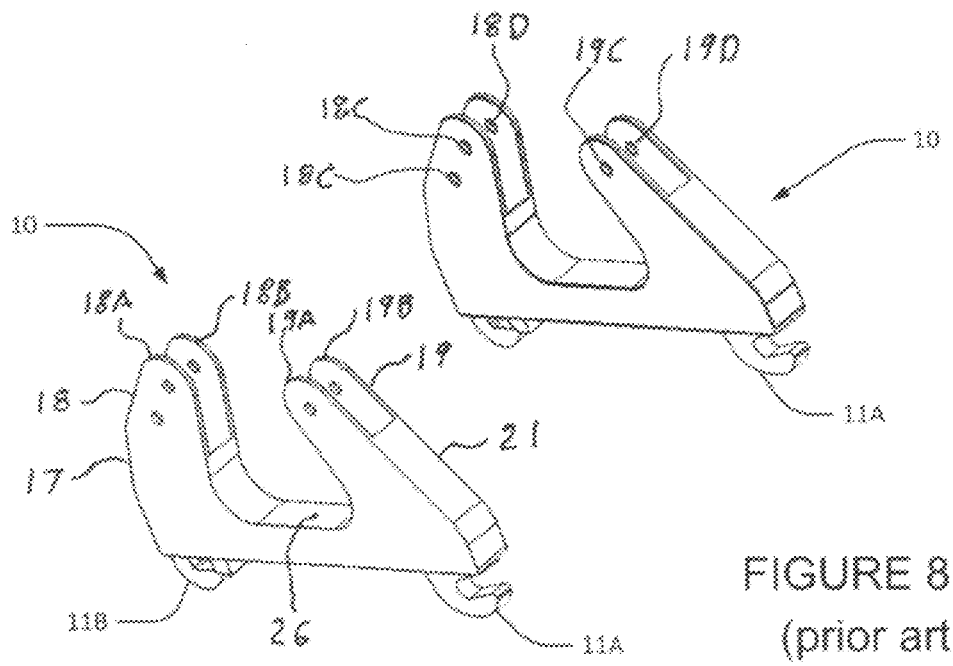
FIGS. 8A and 8B are respectively a perspective view from above and a perspective view from below of exemplar OEM seat.
Figure 8:
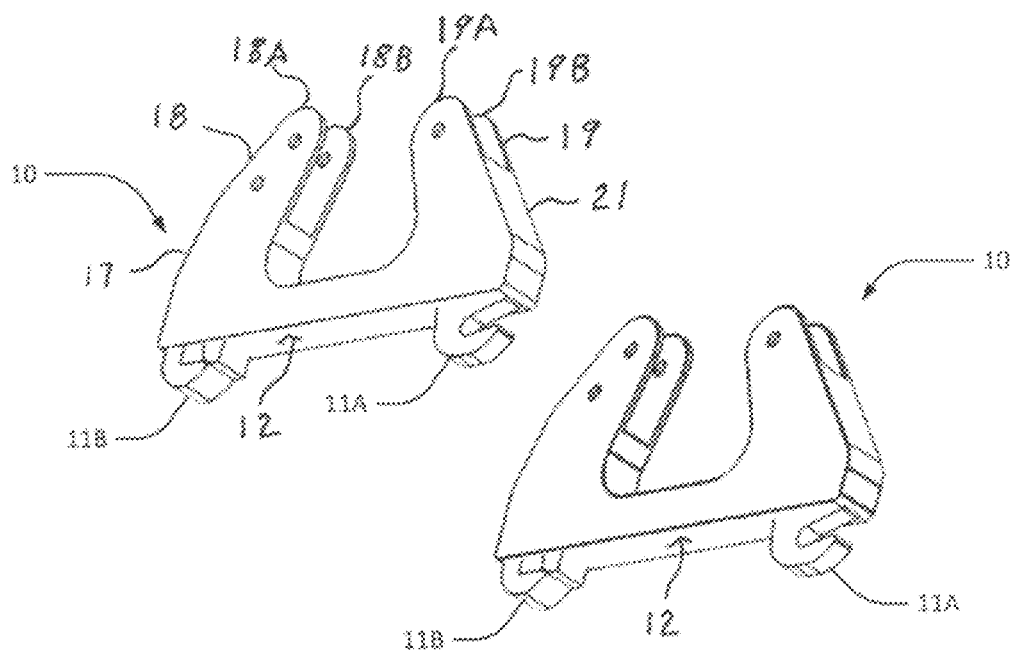

FIGS. 8A and 8B show the OEM seat legs 10 in schematic drawing form as exemplary for describing the present invention. These are shown in the spaced-apart relationship as is exemplary of their installation in the van. The seat legs 10 are mounted axially of the van with a bottom surface 12 resting on the van floor 14 (FIG. 3B) and affixed to the van floor 14 by the fixed hook 11A and hinged latch 11B to the latch bars 12 which are affixed to the vehicle floor 14. The fixed hook 11A is at the front of the seat leg and the hinged latch 11B is at the rear of the seat leg. The seat legs 10 have an upward extending rear support member 17 terminating in a rear flange portion 18 defined by spaced apart rear mounting flange plates 18A and 18B and an upward extending forward support member 21 terminating in a forward flange portion 19 defined by spaced apart forward mounting flange plates 19A and 19B. The rear support member 17 and the forward support member 21 are maintained in separated position by a bar portion 26. The rear support member 17 has mounting holes 18C (two of them) and 18D (also two of them) located laterally-oppositely in each of rear flange mounting plates 18A and 18B. Also, the forward support member 21 has mounting holes 19C and 19D located oppositely in each of the forward flange mounting flange plates 19A and 19B.

Figure 9A:
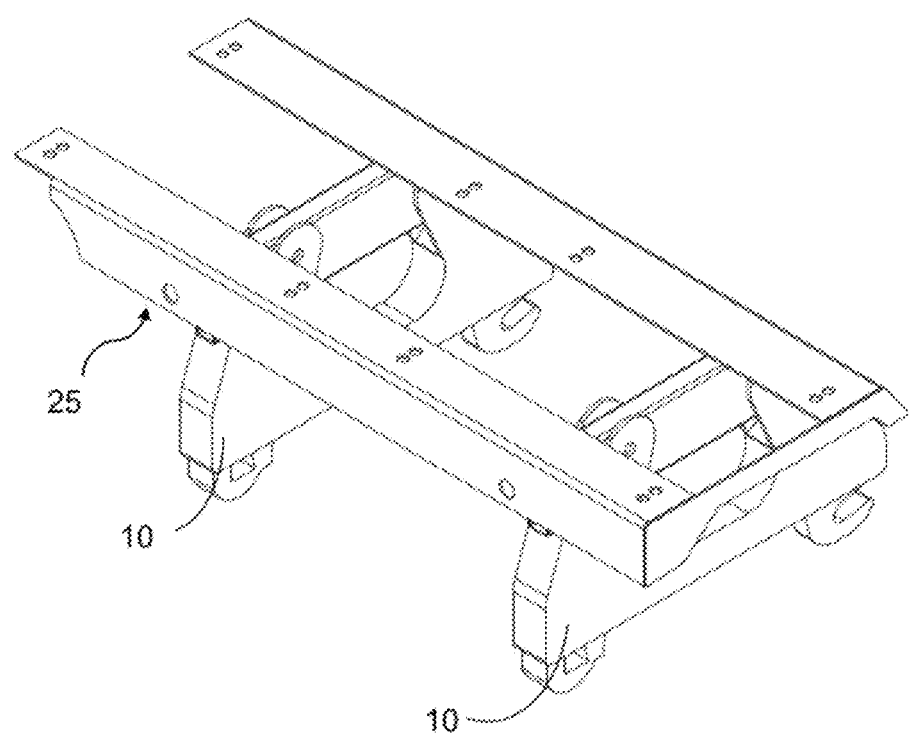
FIGS. 9A and 9B are a perspective view from above and a perspective view from below of an assembled view of an embodiment with a pair of OEM seat legs attached to an adapter base (fasteners being omitted).
Figure 9B:
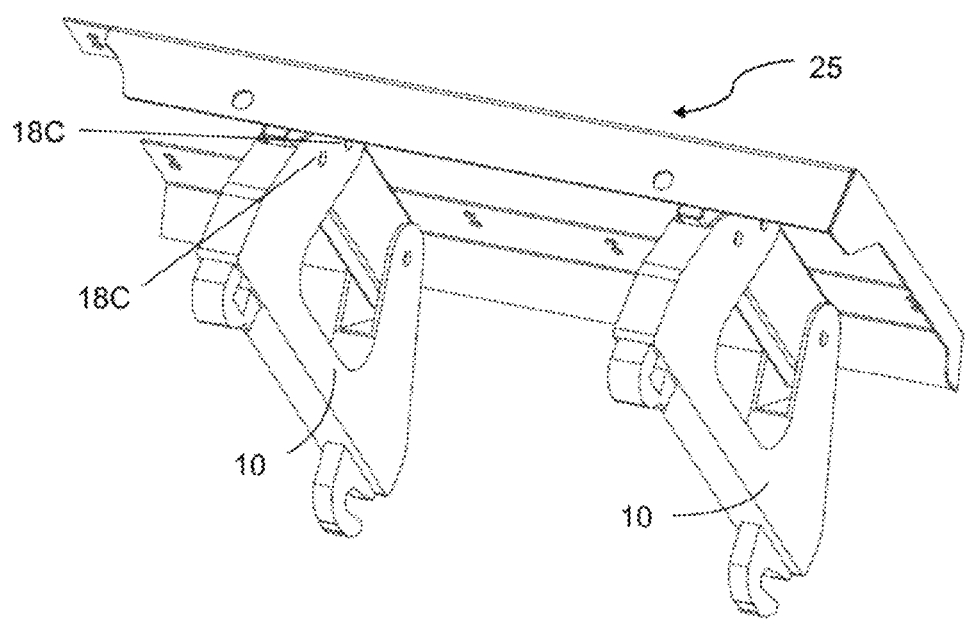

FIGS. 9A and 9B depict an exemplary assembly of the seat legs 10 to an embodiment of the adapter base 25 (as seen in FIGS. 7A and 7B) from perspective views above and below the assembly respectively. Although not shown it is understood that fasteners extend through the holes in the seat legs 10 and aligned holes 18C in the legs aligned with holes 39 (not visible) in the adapter base 25.

Figure 10:
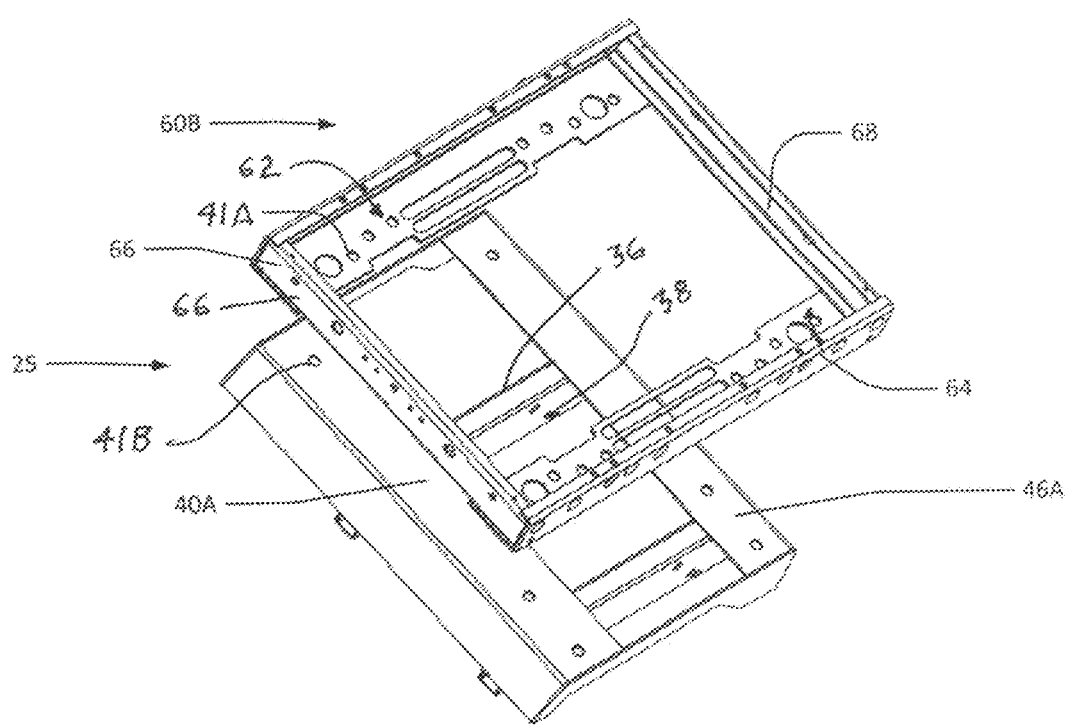
FIG. 10 is an exploded perspective view from the above of a portion of a non-OEM seat frame for a conversion seat and an embodiment of the adapter base.

FIG. 10 shows an exploded perspective view of the adapter base 25 with a seat base frame 60B. The seat base frame 60B is installed as part of the non-OEM seat which will be further described below. The seat base frame 60B has axially extending struts 62 and 64 extending from a front bar 66 to a rear bar 68. The struts 62 and 64 are shaped and ported (meaning holes or orifices) for fasteners to attach them to the adapter base 25, specifically to the planar struts 40A and 46A. Also shown in FIG. 10 are exemplary vertically facing orifices 41A for receiving vertically oriented fasteners on the seat base frame 60B and mating orifices 41B on the adapter base 25 for receiving the same fasteners. Similar horizontally facing orifices 38 on the adapter base beam 36 are utilized to mate with fastener orifices located on the flange plates of the OEM seat leg as described above.

Figure 11:
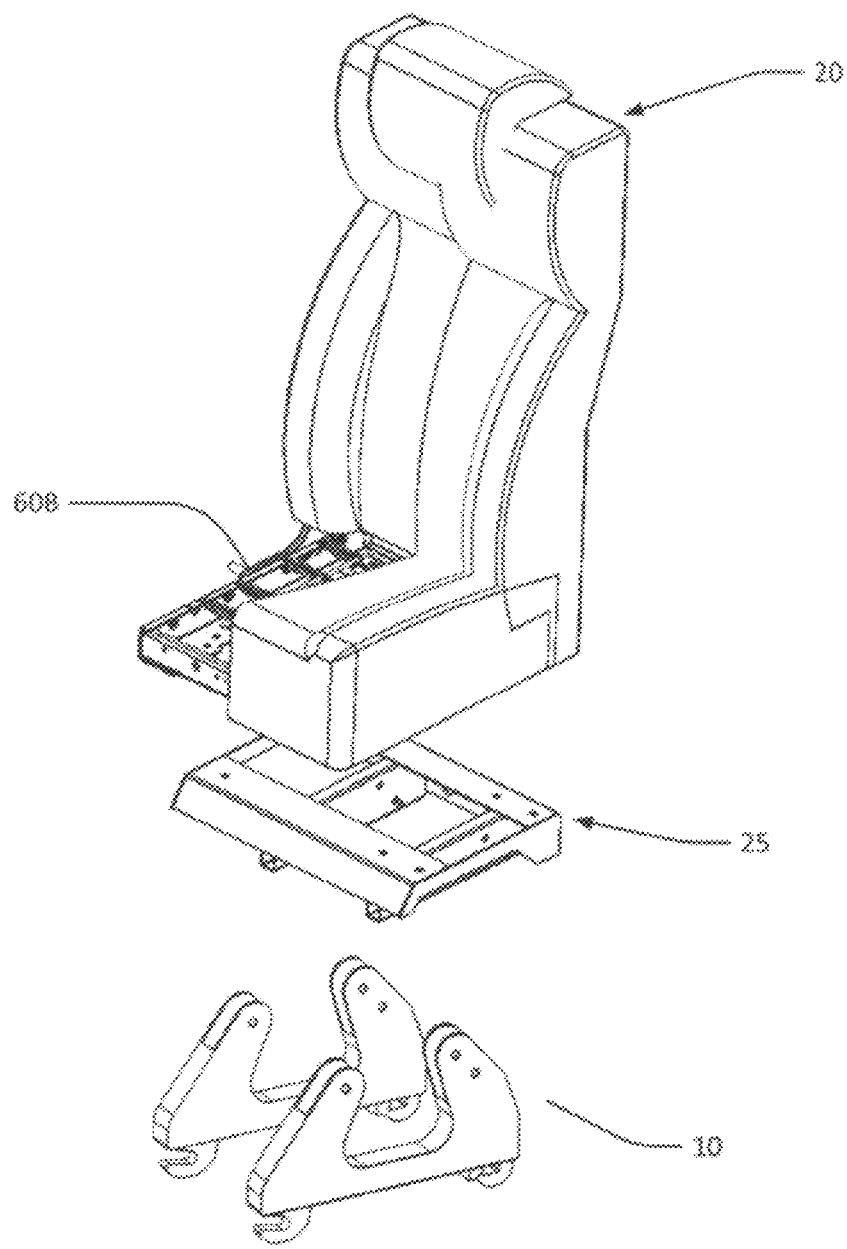
FIG. 11 shows an exploded/cut-away perspective view of an embodiment of the conversion with the adapter base installed with an after-market or non-OEM seat onto OEM seat legs. Also shown is the internal seat frame from FIG. 10 to which the seat cushions and the adapter base are attached.

FIG. 11 shows a conversion embodiment of an exploded/cut away perspective view of a single seat in fully upholstered form in which the seat legs 10, adapter base 25 and the seat base frame 60B as part of a non-OEM seat 20 are shown.

From the basic embodiment as shown for a single seat structure, there are many variables available. As will be appreciated the design of the adapter base is such that it is variable while keeping the basic design structure of the lateral beams and the axial beams so that the strength from that design is kept for all arrangements.

Figure 12:
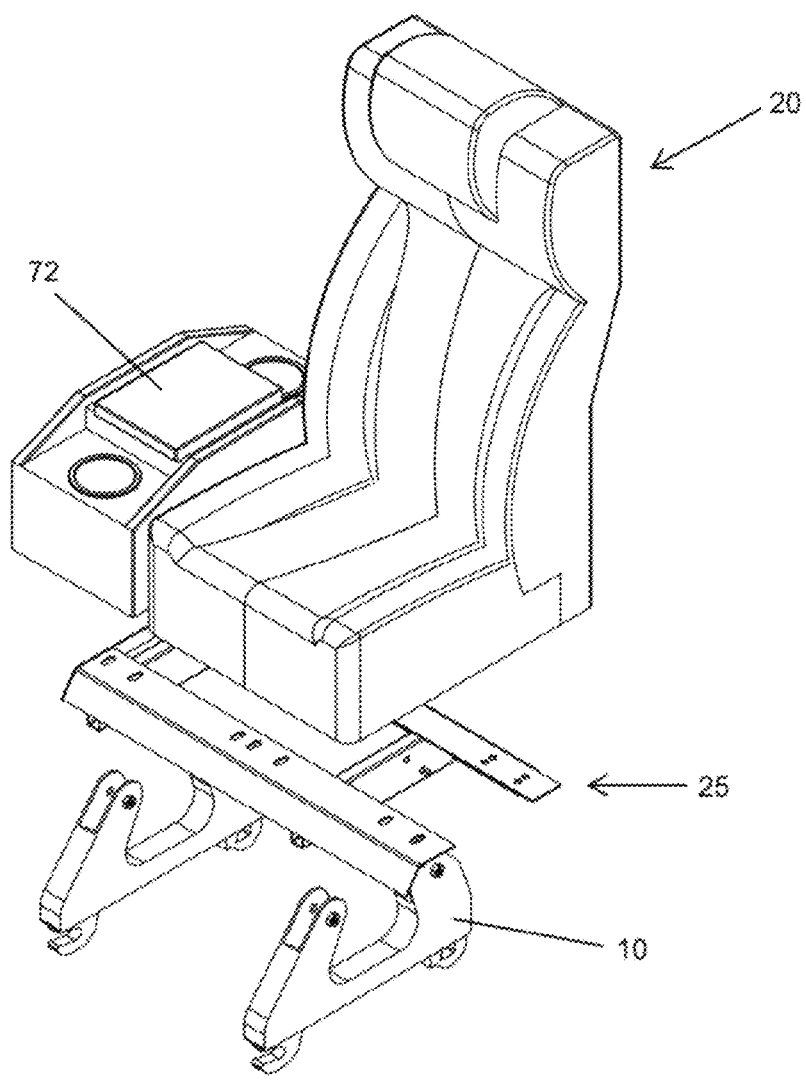
FIG. 12 shows an exploded perspective view of an embodiment of a conversion using the adapter base configured for a non-OEM seat and with a seat console, along with the OEM seat legs.

One such variable is the embodiment of FIG. 12 in which the adapter base 25 is elongated beyond the side of the non-OEM seat 20 to provide for further mounting adjacent the seat 20 in which a console 72 can be fitted in place.

Figure 13A:
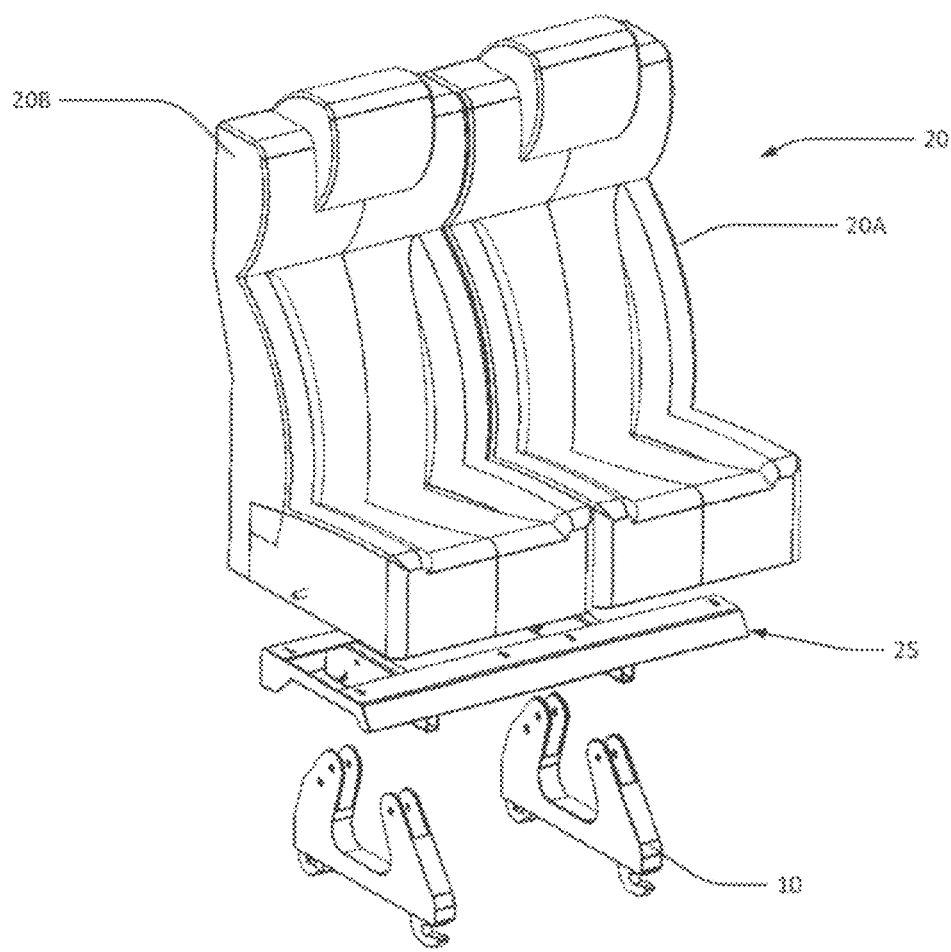
FIGS. 13A and 13B show exploded perspective views from above and below, respectively, of an embodiment of a conversion with the adapter base configured for a non-OEM two seat arrangement, along with the two seats and OEM seat legs and the seat frames.
Figure 13B:
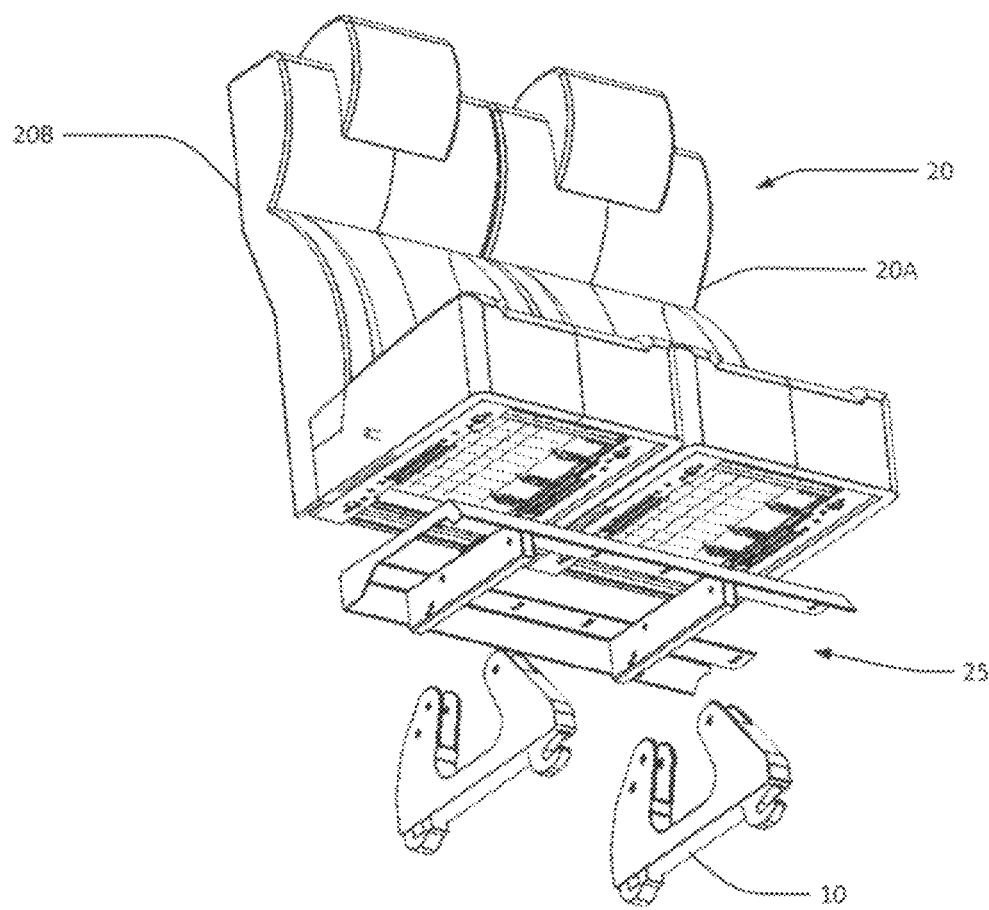

FIGS. 13A and 13B are exploded perspective views of an exemplary non-OEM two seat assembly from above and below, respectively. Shown in this embodiment is an embodiment in which the adapter base 25 is sufficiently long, laterally to hold two non-OEM seats 20A and 20B.

Figure 14A:
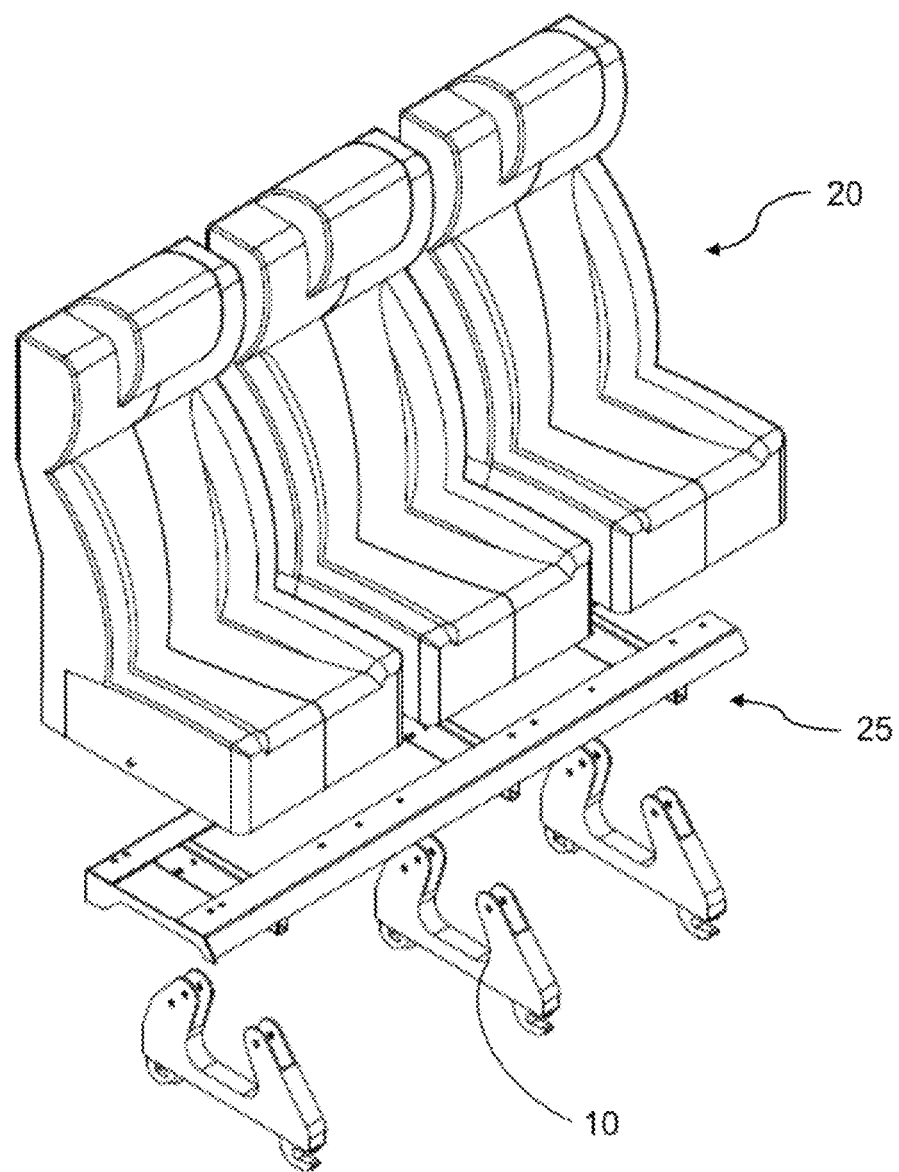
FIGS. 14A and 14B show exploded perspective views from above and below, respectively, of an embodiment of a conversion the adapter base configured for a non-OEM three seat arrangement, along with the three seats and OEM seat legs and the seat frames.
Figure 14B:
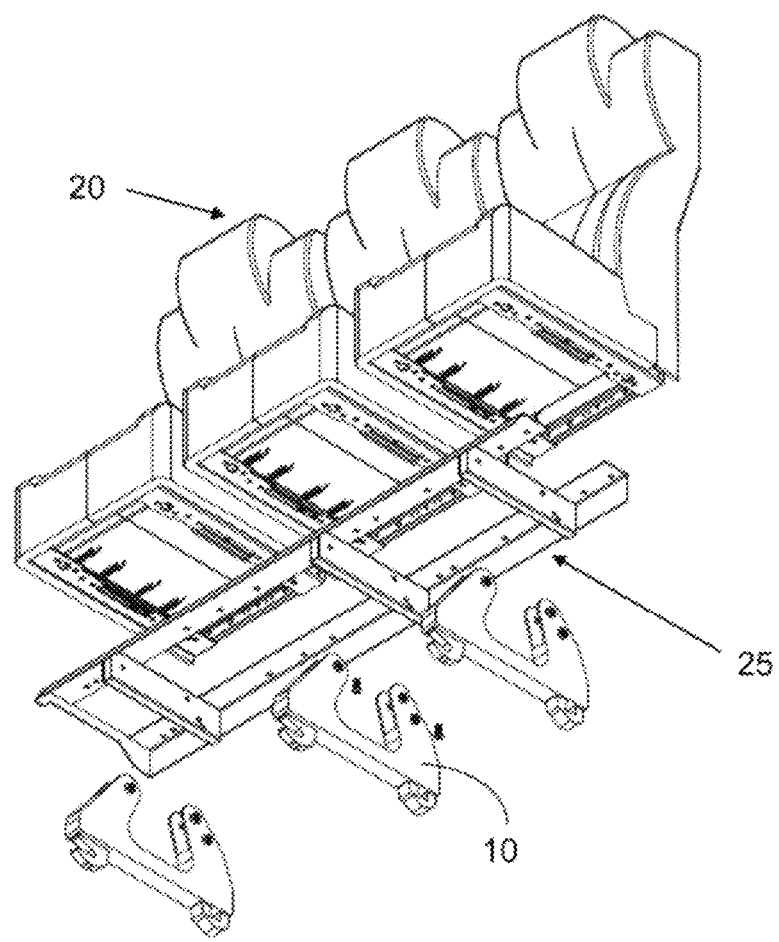

FIGS. 14A and 14B are exploded perspective views of an exemplary non-OEM three seat assembly from above and below, respectively. Shown in this embodiment is an adapter base 25 which is sufficiently long laterally to hold three seats and having a third seat leg 10.

As will be seen below there are numerous replacement seating arrangements for each of the T150 and T350. However, for preserving the robust OEM construction these are limited to using the OEM placement of the floor struts and cross bars and with the OEM seat legs. This is shown in FIG. 15A for the T150 in its OEM 10 Passenger Commuter seating version with floor struts 16 and in FIG. 15B for the T350 in its OEM 12 Passenger Commuter seating version with floor struts 16.

Figure 16A:
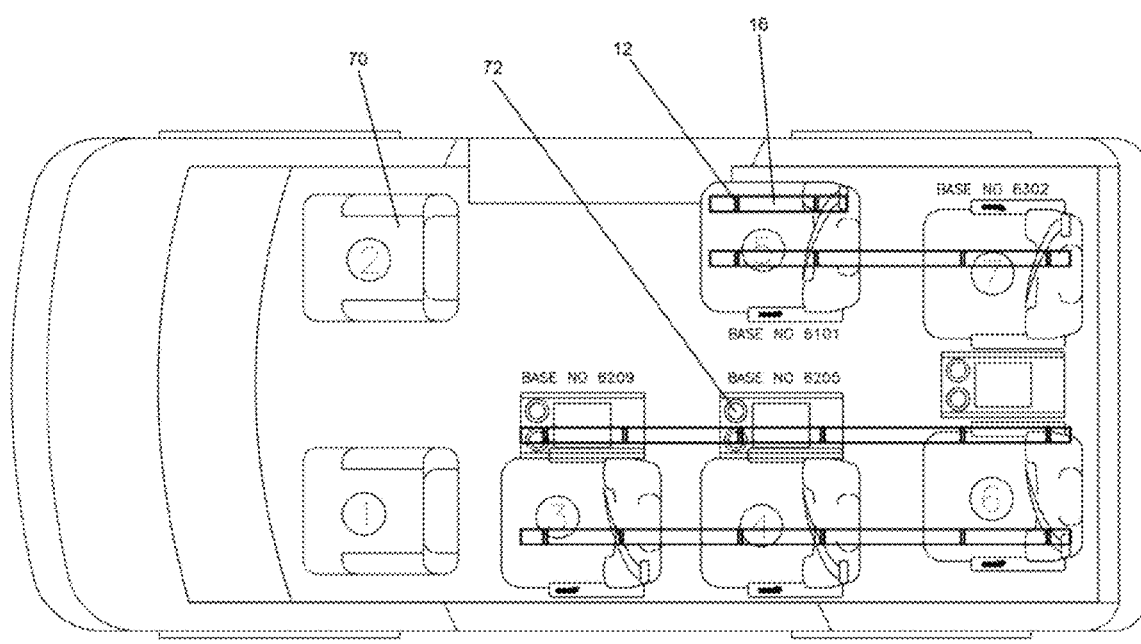
FIGS. 16A-16F shows a series of conversions from a T150 OEM van that has OEM struts with cross bars and OEM seat legs (not shown). Also, the adapter base identification number is shown for each conversion seat arrangement and the seats are numbered for reference.

A set of plan views FIGS. 16A-16F shows favored conversion configurations of seat arrangement embodiments in the Ford Transit T150 in which single, double and triple seating can be selected as well as console and or tray can be accommodated. The conversions consistently have the same number of seats as the OEM version, but the seats are an upgrade and either consoles or trays are applied. But in each case the OEM struts 16 and cross bars 12 are used as shown. Also the adapter base numerical designations (BASE No.) are indicated in the Figures and these will be further described below. Also the seats are numbered in order to allow convenient seat arrangement planning FIG. 16A is 7-seat configuration with 22-inch seats 70, which are typically but not necessarily leather covered (can be real or artificial leather) and with consoles 72. This is identified as the 2016 Ford Transit T150 7 PASSENGER SUPER VIP model.

Figure 16B:
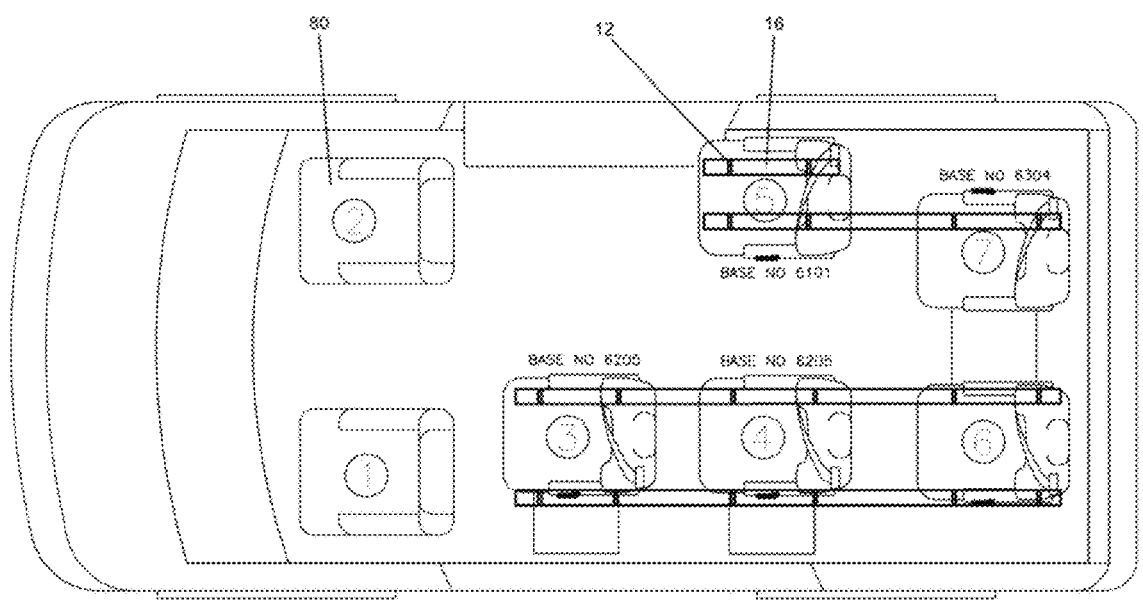

FIG. 16B is a 7-seat configuration with 18-inch seats 80 which are typically, but not necessarily cloth covered. This is identified as a 2016 Ford Transit T150 7 PASSENGER COMMUTER model.

Figure 16C:
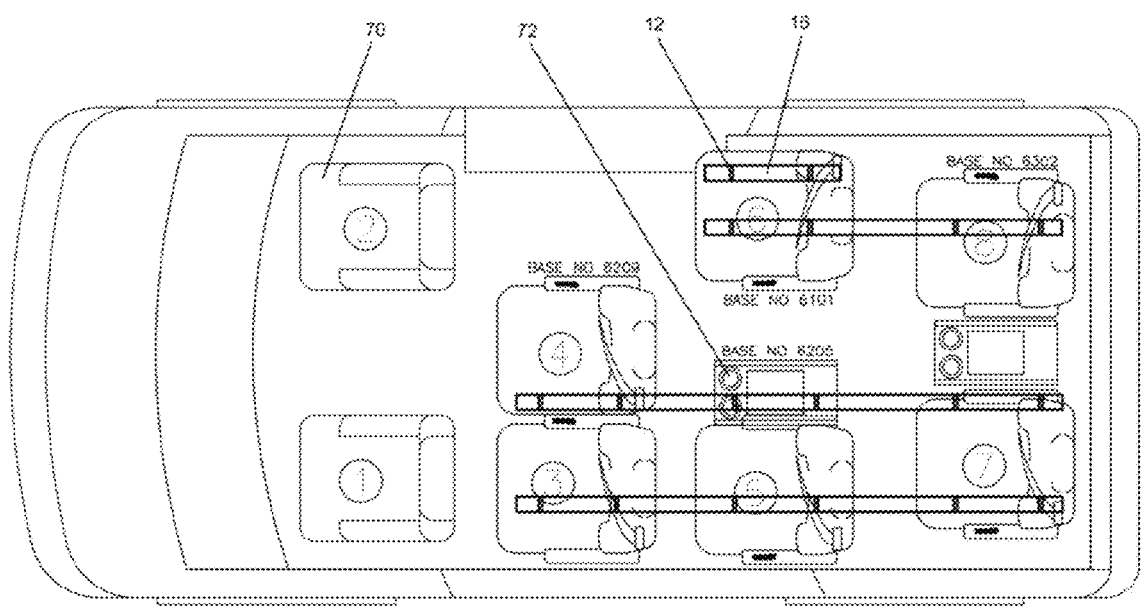

FIG. 16C is an 8-seat configuration with 22-inch seats 70, which are typically but not necessarily leather covered (can be real or artificial leather) and with consoles 72. This is identified as the 2016 Ford Transit T150 8 PASSENGER SUPER VIP model.

Figure 16D:
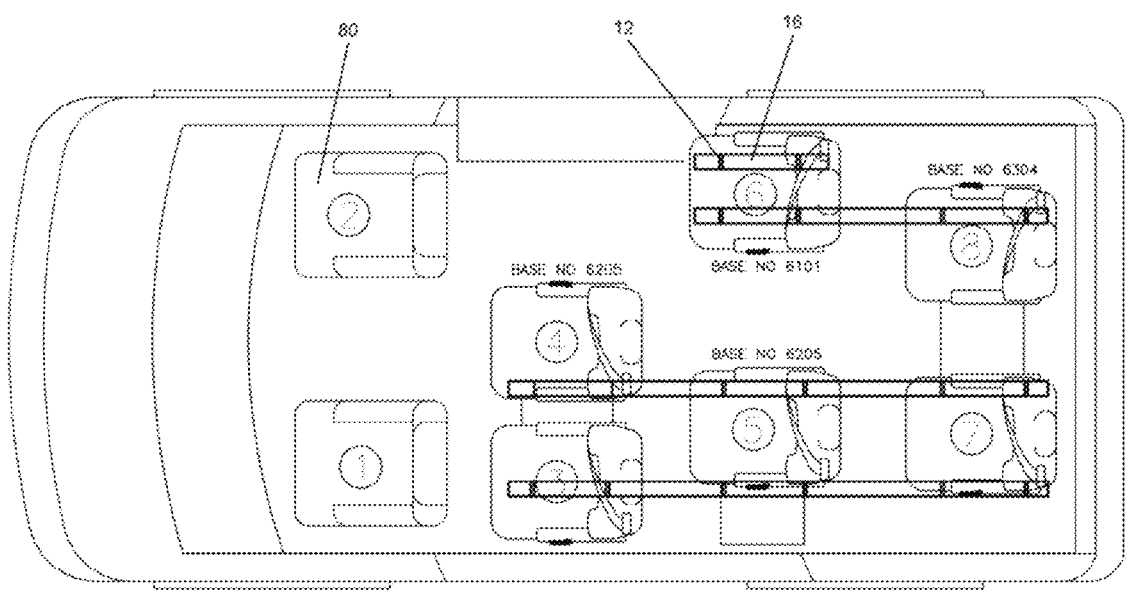

FIG. 16D is an 8-seat configuration with 18-inch seats 80, which are typically but not necessarily cloth. This is identified as the 2016 Ford Transit T150 8 PASSENGER COMMUTER model.

Figure 16E:
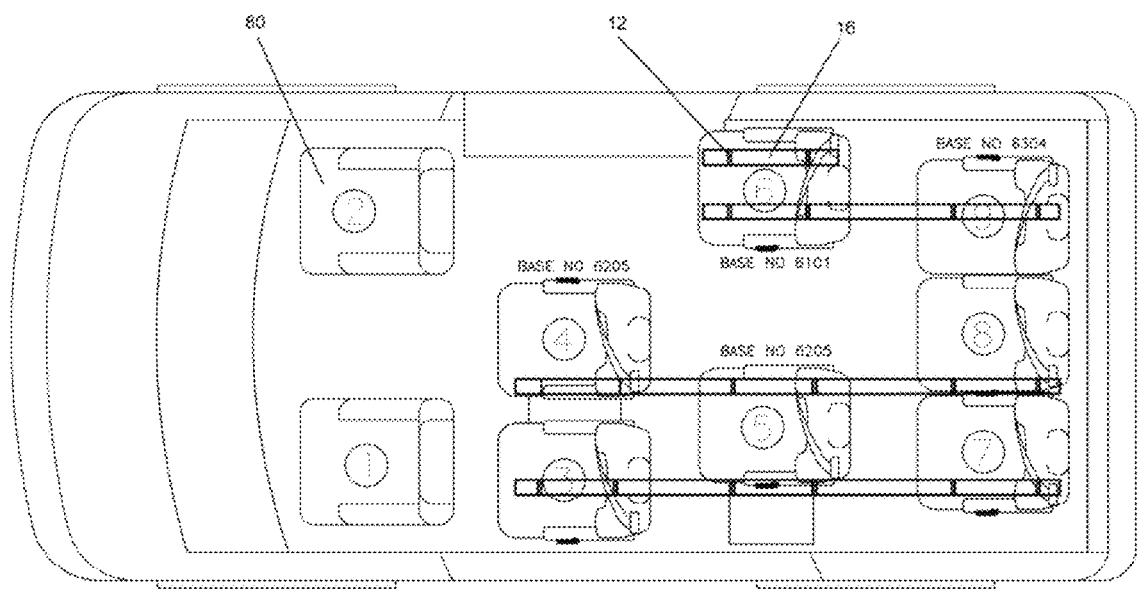

FIG. 16E is a 9-seat configuration with 18-inch seats 80, which are typically but not necessarily cloth. This is identified as the 2016 Ford Transit T150 9 PASSENGER COMMUTER model. Note that the difference between the 8-seat configuration of FIG. 16D and the 9-seat configuration of FIG. 16E is the absence of the third, center seat in the 8-seat configuration with a tray feature and three seats in that rear row in the 9-seat configuration. They both use the same adapter base on that rear row.

Figure 16F:
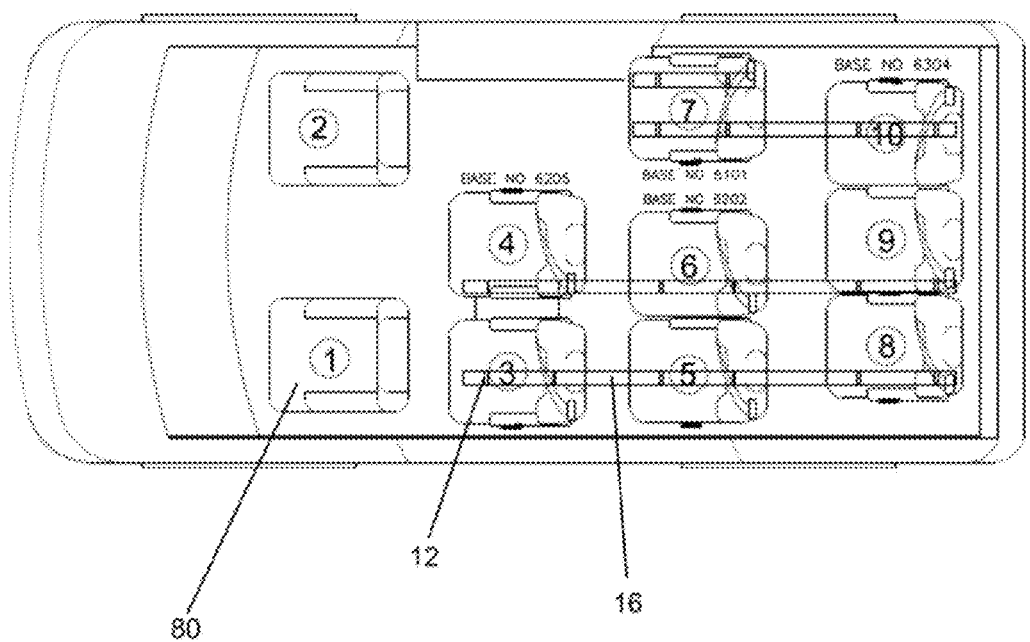

FIG. 16F is a 10-seat configuration with 18-inch seats 80, which are typically but not necessarily cloth. This is identified as the 2016 Ford Transit T150 10 PASSENGER COMMUTER model.

A set of plan views FIGS. 17A-17E shows favored configuration of seat arrangement embodiments in the Ford Transit T350 in which single, double and triple seating can be selected and a console or tray can be accommodated as shown. Also the seats are numbered in order to allow convenient seat arrangement planning.

Figure 17A:
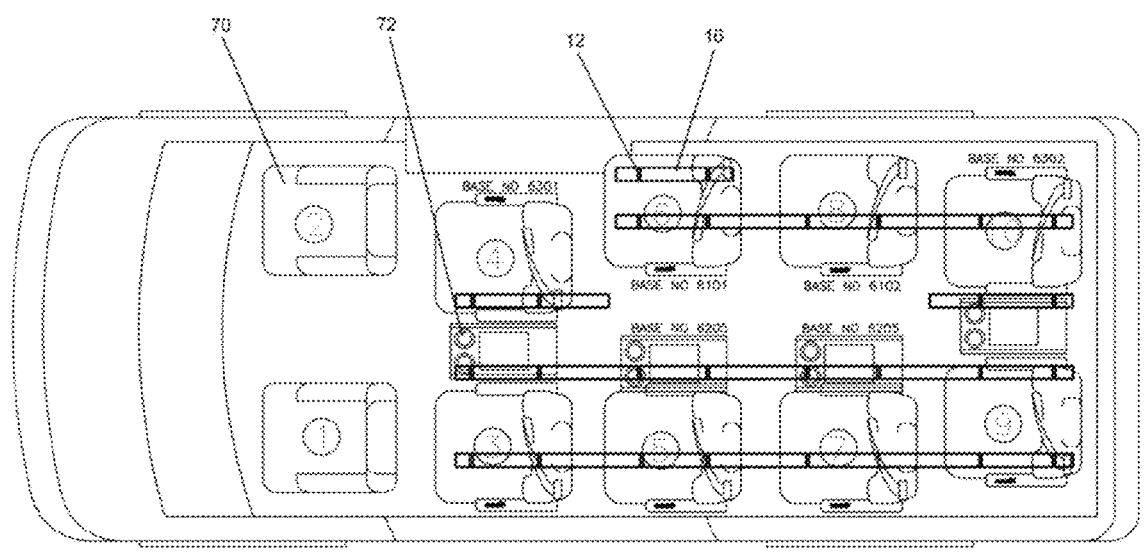
FIGS. 17A-17F shows a series of conversions from a T350 OEM van that has OEM struts and OEM seat legs (not shown). Also the adapter base identification number is shown for each conversion seat arrangement and the seats are numbered for reference.

FIG. 17A is a 10-seat configuration with 22-inch seats 70, which are typically but not necessarily leather covered (can be real or artificial leather) and with consoles 72. This is identified as the 2016 Ford Transit T350 10 PASSENGER SUPER VIP model.

Figure 17B:
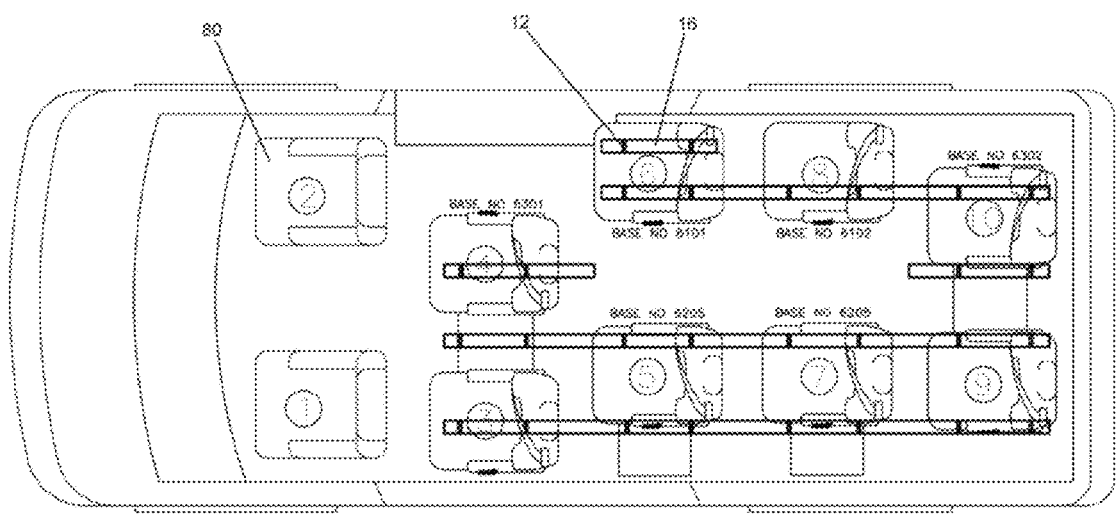

FIG. 17B is a 10-seat configuration with 18-inch seats 80, which are typically but not necessarily cloth. This is identified as the 2016 Ford Transit T350 10 PASSENGER COMMUTER model.

Figure 17C:
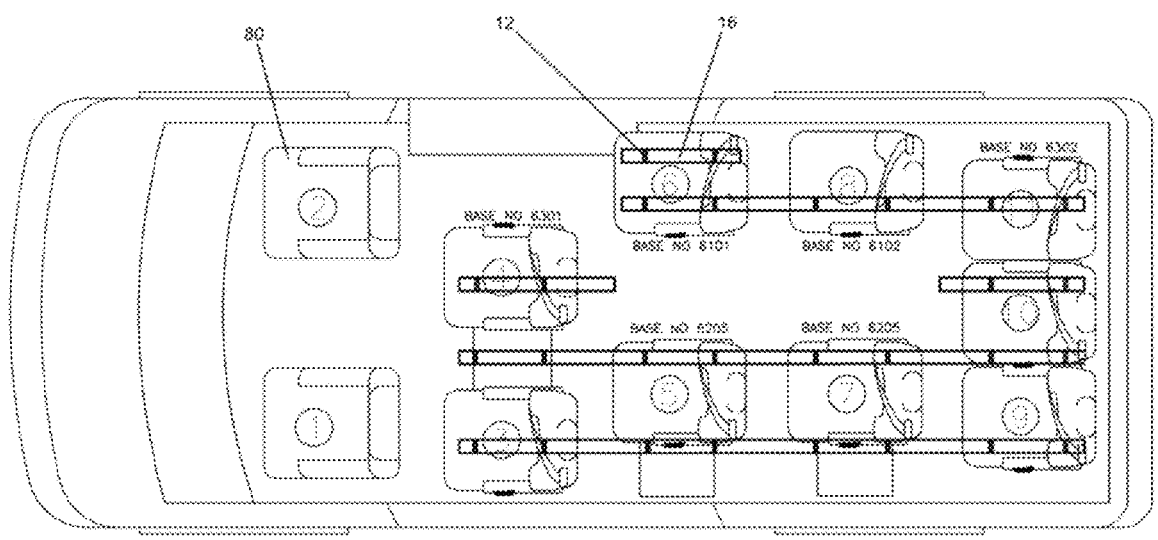

FIG. 17C is an 11-seat configuration with 18-inch seats 80, which are typically but not necessarily cloth. This is identified as the 2016 Ford Transit T350 11 PASSENGER COMMUTER model.

Figure 17D:
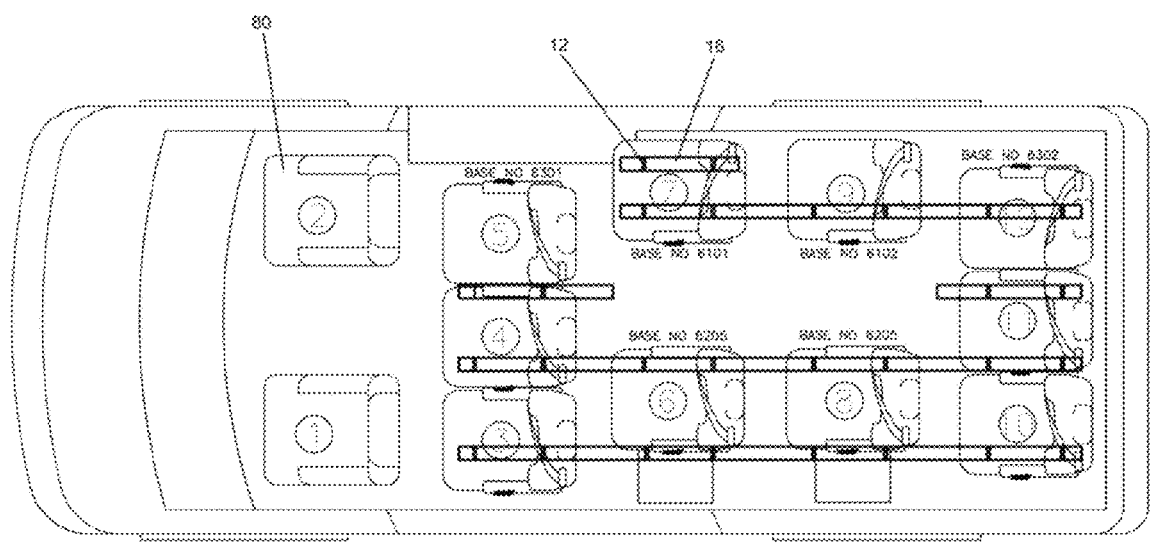

FIG. 17D is a 12-seat configuration with 18-inch seats 80, which are typically but not necessarily cloth. This is identified as the 2016 Ford Transit T350 12 PASSENGER COMMUTER model.

Figure 17E:
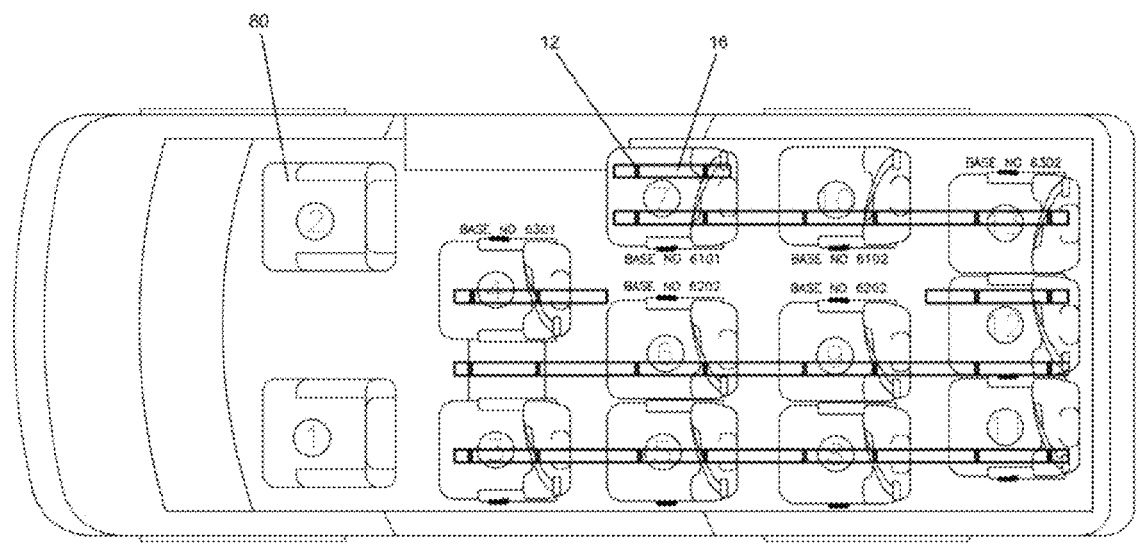

FIG. 17E is a 13-seat configuration with 18-inch seats 80, which are typically but not necessarily cloth. This is identified as the 2016 Ford Transit T350 13 PASSENGER COMMUTER model.

Figure 17F:
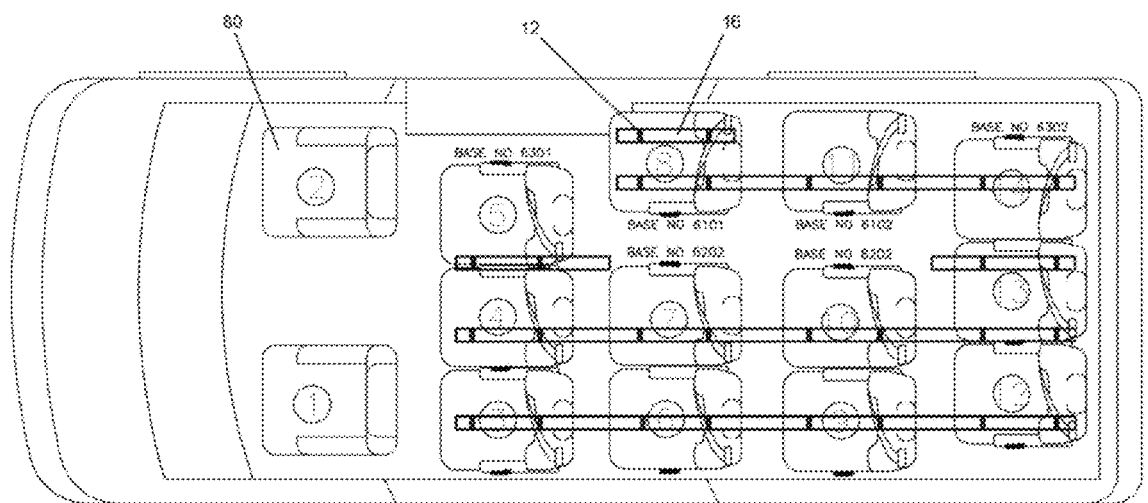

FIG. 17F is a 14-seat configuration with 18-inch seats 80, which are typically but not necessarily cloth. This is identified as the 2016 Ford Transit T350 14 PASSENGER COMMUTER model.

But in each case the OEM struts 16 and cross bars 12 are used as shown. Also the adapter base numerical designations are indicated in the Figure; these will be further described below.

Figure series 18A-18 are the adapter bases with their numerical identification as shown in the Fig. series 16 and 17 and elsewhere in the Figs. In the following figures, location of the fastener holes for the 18-inch and 22-inch seats is shown by the circled numbers (18) and (22), respectively. While the exact dimensions for the adapter base parts and the fastener hole locations, for its various seat configurations is not shown, that aspect is within the skill of a person having ordinary skill in this technology by following this description.

The adapter base design allows a significant quality control and cost control inventive contribution to the overall conversion invention. That is by using a design for the adapter base that is adjustable to be made in different lengths required while retaining the basic robust engineering design for attaching to the seat frame and to the seat legs. An even further inventive efficiency that is available with the adapter base design is that it can made, either in advance or to order to accommodate either both or selected one of the 18-inch or 22-inch seats. This is done by locating the fastening holes to align with cooperative fastening holes in both the 18-inch and/or 22-inch seat frames so that prior construction of the adapter bases can then allow efficient conversions from an inventory of adapter bases. Further the adapter base design is readily configured to fasten to either two or three seat legs by simply applying the seat leg beams on the front and rear struts. This can be accomplished by providing in advance or to order the fastening holes in the front and rear struts.

Figure 18A:
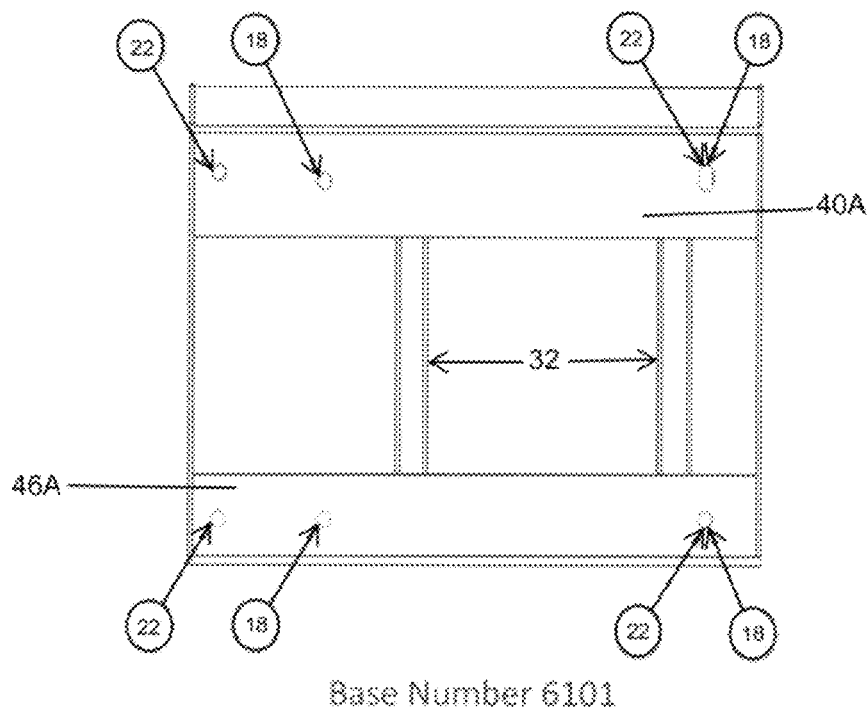
FIGS. 18A-18I show a set of adapter bases varied for adapting specified seating conversions along with the adapter base identification number
Figure 18B:
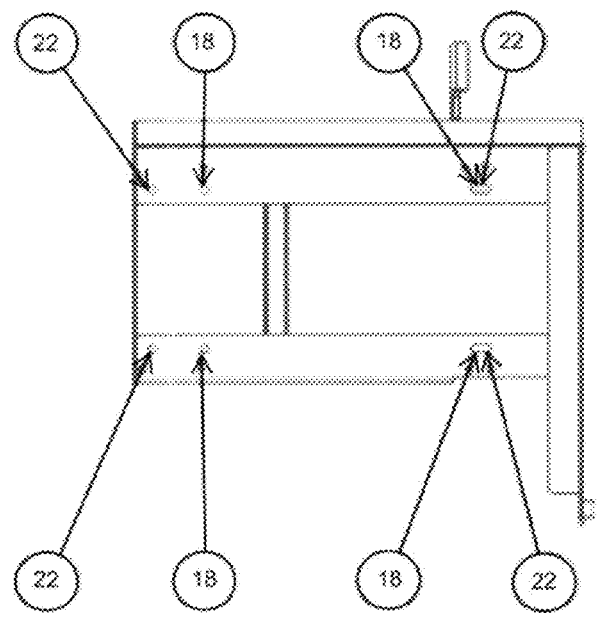
Figure 18C:
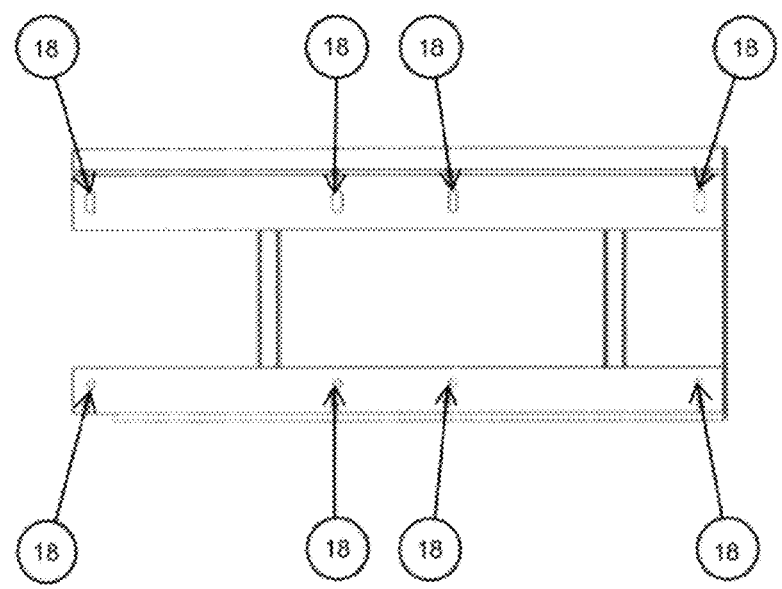
Figure 18D:
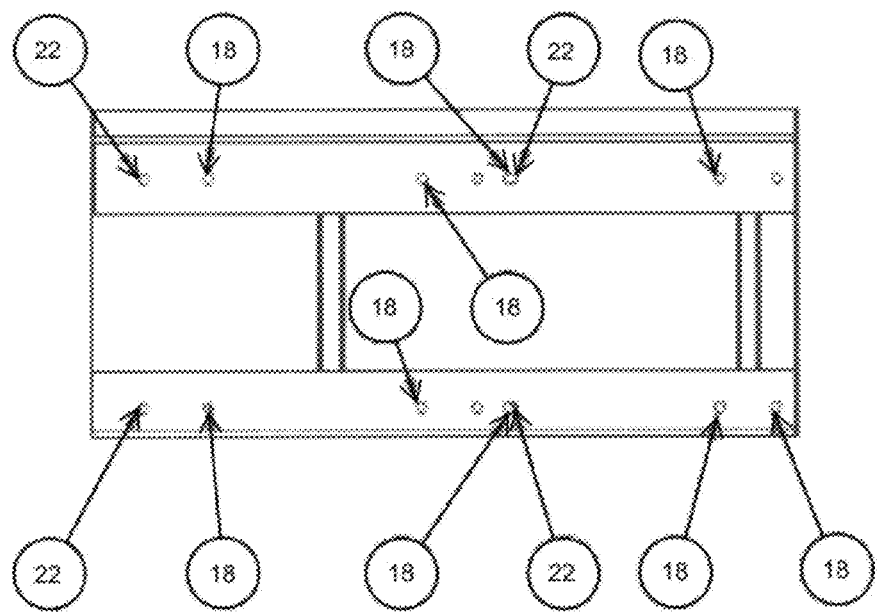
Figure 18E:
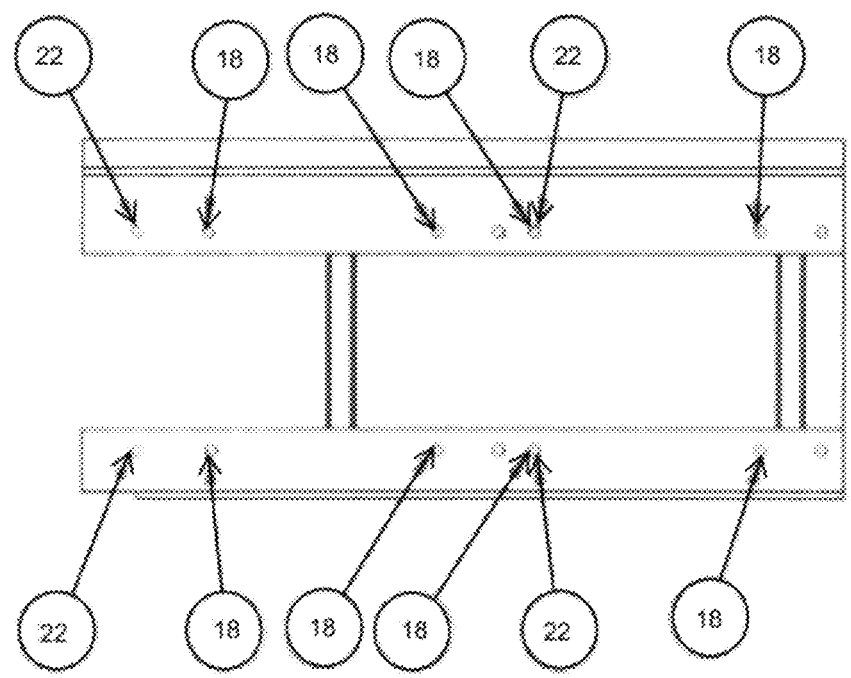
Figure 18F:
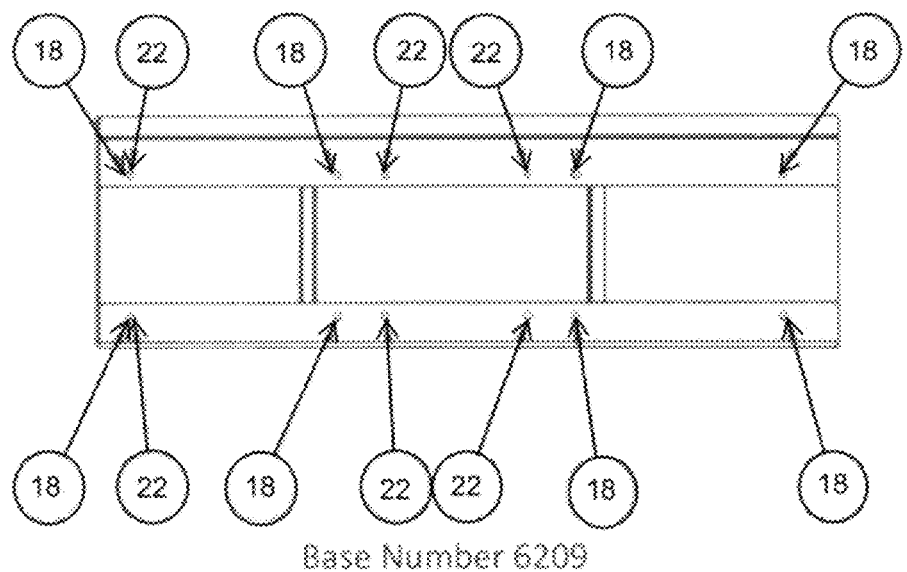
Figure 18G:
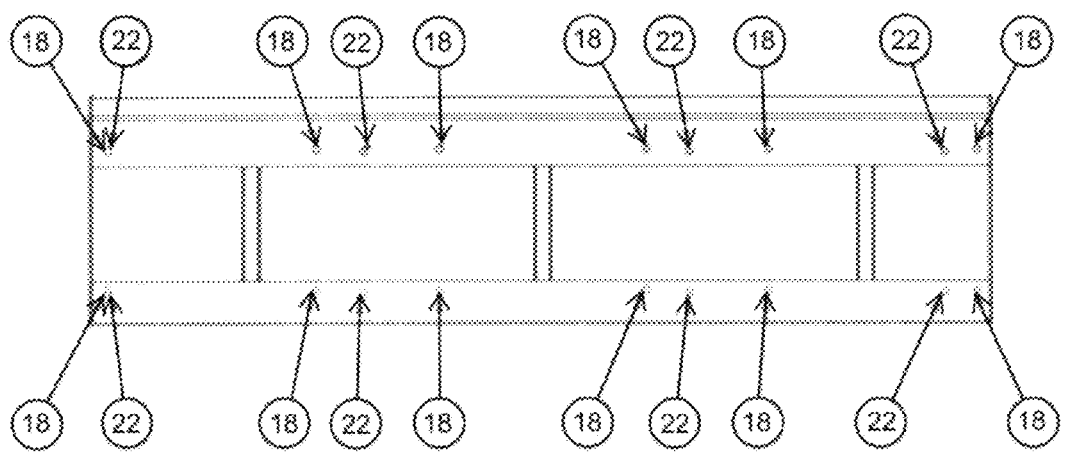
Figure 18H:
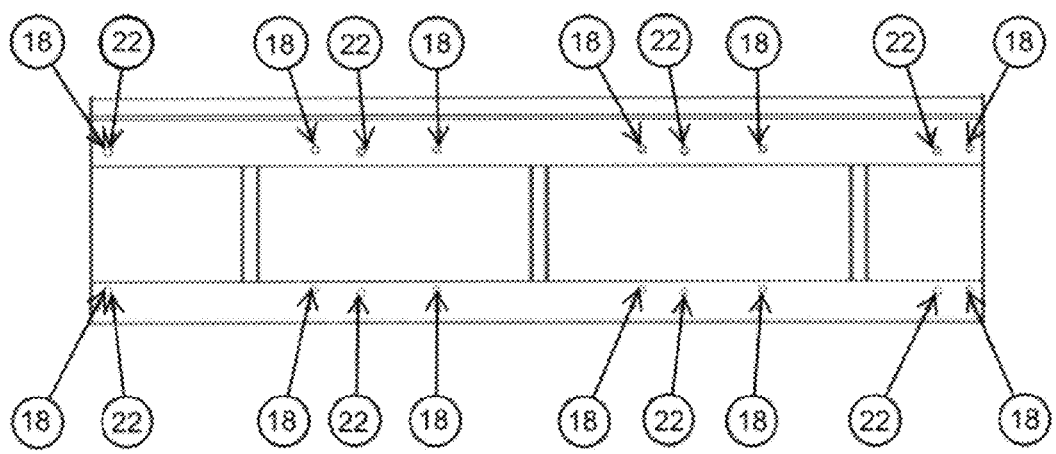
Figure 18I:
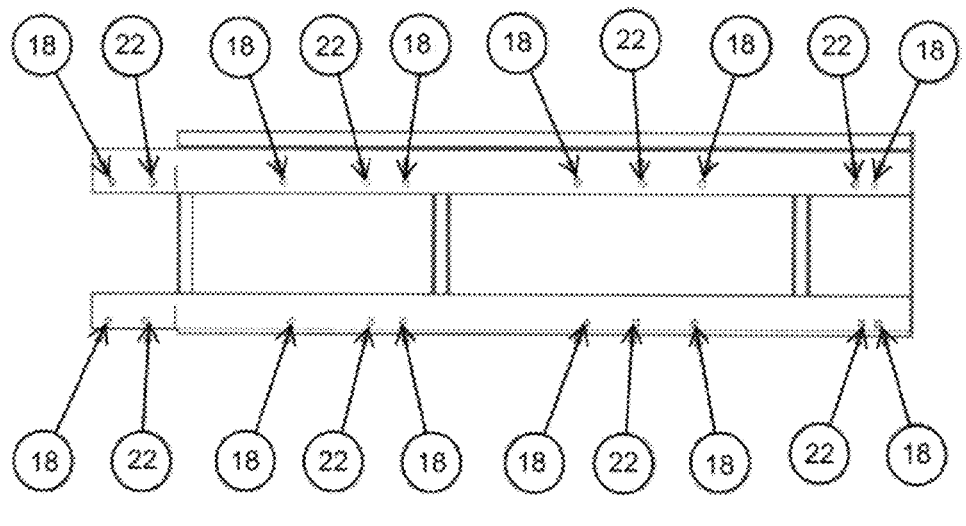

FIGS. 18A through 18I show a variety of adapter base configurations. It can be considered that the adapter base 6101 of FIG. 18A is the basic structure having a seat attachment portion (as described with reference to FIGS. 7A and 7B) which presents the flat surfaces 40A and 46A which are commonly planar and the seat leg portion (also as seen in FIGS. 7A and 7B). Now as the descriptions of the adapter bases proceeds it can be appreciated that by simply extending the length of the seat attachment portion and adding elements for the seat leg portion the same design can adapt (thus the name adapter base) to accommodate to the same replacement seat design and to the same OEM floor structure and seat legs. Notably that same adapter design and its variation allows for fastener placement for two types of seats. One of these is called the 18-inch seat and the other is called the 22-inch seat. In this context the 18 inch seat is for the Commuter designated conversion and the 22-inch seat is for the VIP conversion. The seat attachment portion being a simple flat member (40A and 46A in FIG. 18A) can be provided with fastener holes for either the 18 or 22-inch seat designation, which are shown in circles in the adapter base figures of FIGS. 18A-18I. The adapters can be made with all the holes, (18) and (22) or with just one or the other. This then allows for great integrity and efficiency of manufacture and installation and anticipating inventory.

Also, the following chart matches each adapter base with its application in the conversions shown in FIGS. 16A-16F and 17A-17F. It also designates the particular employment of number of seats and/or consoles/trays that each adapter base accommodates; and its being in a T150 and/or T350 conversion and its row position.

| Adapter Number Base | FIGS. | Console/Trays | Number of Seats | T150 | T350 | Placement |
|---|---|---|---|---|---|---|
| 6101 | 18A; 16A, 168, 16C, 16D, 16E, 16F, 17A, 17B, 17C, 17D, 17E, 17F | None | 1 | Y | Y | 2nd Row Passenger Side |
| 6102 | 18B; 17A, 178, 17C, 17D, 17E, 17F | Console: 16C | 1 | N | Y | 3rd Row Passenger Side |
| 6201* | | | 2 | N | N | 2nd Row Driver Side |
| 6202 | 18C; 16F, 17E(2) | None | 2 | Y | Y | 3rd Row Driver Side |
| 6204* | 18D | | 1 or 2 | N | N | 2nd Row Driver Side |
| 6205 | 18E; 16A, 16B (2), 16C 16D, 16E, 17A (2), 17B (2), 17C (2), 17D(2) | Console: 16A, 16C, 17A (2) Trays: 16B (2), 16D, 16E, 17B (2), 17C (2), 17D (2) | 1 or 2 | Y | Y | 3rd Row Driver Side |
| 6209 | 18F; 16A, 16B, 16C, | Consoles: 16A | 2 | Y | N | 2 Passenger |

| Adapter Number Base | FIGS. | Console/Trays | Number of Seats | T150 | T350 | Placement |
|---|---|---|---|---|---|---|
| 6301 | 16D, 16E, 16F, 18G; 17A, 17B, 17C, 17D, 17E, 17F | None | 3 | N | Y | Front Hole 3 Passenger Front Hole |
| 6302 | 18H; 16A, 16C, 17B, 17C, 17D, 17E, 17F | Consoles: 16A, 16C Tray: 17B | 3 | Y | Y | 3 Passenger Rear Hole |
| 6304 | 18I; 16B, 16D, 16E, 16F | Tray: 16B, 16D | 3 | Y | N | 3 Passenger Rear Hole |

*These adapter bases are not shown in any conversion figure.

The foregoing are specific embodiments for the T150 and T350 OEM vehicles. However the structure and method of adapting any van in which OEM seat legs can be attached to an OEM floor construction would then give access to the invention by allowing design of an adapter base that has a seat attachment portion configured to be fastened to a new seat and a seat leg attachment portion configured to be fastened to the OEM seat leg such that the seat leg is in its OEM attachment to the floor construction. The adapter base is readily varied by elongating its seat attachment portion and by adding and positioning its seat leg attachment members.

It can be appreciated that the adapter base can be made as in the foregoing example to work with a particular van model and particular seat models. In fact, it is the case that a catalog of replacement seats is common in the industry suppliers. Therefore the adapter base or a series of adapter base designs can be made for popular van models and for each of a catalog of seats, and can be made in advance to accommodate popular vans and seats.

It is understood that the underlying fundamental design concept for the adapter base satisfies the need for a robust design at the same level of quality as the OEM design portions that reside in the van conversions. The design has available variations to accommodate one, two or three seat options as well as accessory options in which the variations retain the robust design qualities of the basic version.

With the foregoing description of embodiments of the invention, now will be described methods of installing them.

The procedure begins with the general set of steps of removing the original seats from the subject vehicle. This procedure provides that the seat legs be disengaged from the vehicle floor and then the seat with the legs still attached is removed. Other ways of doing this can be elected, but it has been found that this is the most convenient. In various vehicle configurations, the seat legs are attached to the vehicle floor by a fixed hook and hinged latch on the seat and a fixed cross bar which receives the hook or hinged latch on the vehicle floor. In various embodiments axial structures are affixed to the vehicle floor which incorporate the fixed cross bars which receive the seat leg hook and hinged latch. FIGS. 3A, 8A and 8B show the OEM seat leg 10, fixed hook 11A and hinged latch 11B structures and FIG. 3B shows the vehicle floor receiving cross bar 12 and the elongated strut 16 for certain OEM vehicles. These are also shown in FIGS. 15A-15B and the FIG. 16 and FIG. 17 series. Specifically, FIGS. 15A and 15B show the axially oriented vehicle floor struts 16 which strengthen the floor-to-seat connection. After removing the seat/set leg combinations from the vehicle, fasteners connecting the OEM seat legs and OEM seats (shown in FIG. 3C) are removed separating the OEM seats from the OEM legs. Next, in various embodiments a selected version of the disclosed adapter base 25 is attached to the OEM seat legs 10 according to the seats and seating configuration desired (see Figs. series 16 and 17). Next, the chosen non-OEM seats 20 are attached to the adapter base 25 with vertically oriented fasteners through adapter base structures 40A and 46A. The order of these two steps is not significant, the seats to adapter base first or the seat legs to adapter base first. FIGS. 7A and 7B show exemplary holes 39 for attaching the replacement seat and 38 for attaching the seat legs. Lastly, the OEM seat legs are reattached to structures in the vehicle floor suitable for receiving the seat legs. In various embodiments, the receiving structures are the laterally-oriented cross bars 12 as seen in FIGS. 3B and 3C which are built into the axially-extending OEM floor struts 16.

What has been described herein is considered merely illustrative of the principles of this invention. Accordingly, it is well within the purview of one skilled in the art to provide other and different embodiments within the spirit and scope of the invention.

The invention claimed is:

1. A method for converting a van vehicle rear seating system from an OEM vehicle seating system to a customized seating system wherein the OEM vehicle seating system has OEM seats and has a plurality of spaced apart OEM seat legs, each seat leg having a forward seat connection portion and a rear seat connection portion to which the OEM seats are attached and the seat legs being attached to the vehicle floor by an OEM attachment structure and the seat leg forward seat connection portion having an upward extending forward support member terminating in a forward flange portion defined by spaced apart forward mounting flange plates defining an axially extending front receiving space and the rear seat connection portion having an upward extending rear support member terminating in a rear flange portion defined by spaced apart rear mounting flange plates defining an axially extending rear receiving space; the front receiving space and the rear receiving space being axially aligned, the method comprising:

providing an adapter base having an axial portion and a lateral portion, the axial portion comprising at least one axial member extending axially from a frontal end to a rearward end and adapted to have the frontal end secured to the forward seat connection portion and the rearward end secured to the rear seat connection portion, said at least one axial portion of the adapter base having a vertical height defined by oppositely facing surfaces, said oppositely facing surfaces being spaced apart to fit into both the rear receiving space and the front receiving space respectively and the lateral portion comprising a pair of axially spaced apart lateral members extending in parallel laterally defining a forward lateral member and a rear lateral member and being connected respectively to the frontal end of the at least one axial member and to the rearward end of the at least one axial member;

removing one or more OEM seats from respective OEM seat legs of the OEM seats;

attaching the adapter base to at least one of the respective OEM seat legs by attaching the frontal end of the at least one axial member to a respective forward seat connection portion of the at least one respective OEM seat leg and the rearward end of the at least one axial member to a respective rear connection portion of the at least one OEM seat leg;

whereby the pair of axially spaced apart lateral members will extend laterally;

providing one or more replacement seats, each replacement seat having axial forward and rearward securing portions located to be secured respectively to the forward and rearward lateral members; and attaching the one or more replacement seats to the mating lateral members.

2. A method as in claim 1 wherein the adapter base is configured to accept vertically oriented fasteners to connect to the one or more replacement seats.

3. A method as in claim 1 wherein the adapter base is configured optionally to accept a single seat or a pair of seats which are supported by two seat legs and having an axial member that is attached to each of the two seat legs.

4. A method as in claim 1 wherein the adapter base is configured to accept three seats which adapter base is supported by three seat legs and having axial members that are attached respectively to each of the three seat legs.

5. A method as in claim 1 wherein the adapter base is configured to accept a horizontally oriented fastener to connect the base to the OEM seat legs.

6. A method as in claim 1 wherein the vehicle is a Ford Transit van.

7. A method as in claim 1 wherein the adapter base has a plurality of axial members, the axial members being spaced apart so as to be attached to spaced apart seat legs.

8. A method as in claim 7 wherein the adapter base has two axial members, the axial members being spaced apart so as to be attached to respectively spaced apart seat legs and the adapter base being attached optionally to one replacement seat or two replacement seats or one replacement seat and a console.

9. A method as in claim 7 wherein the adapter base has three axial members, the axial members being spaced apart so as to be attached to respectively spaced apart seat legs and the adapter base being attached optionally to three replacement seats or to two replacement seats and a console.

10. A method as in claim 7 wherein the adapter base has four axial members, the axial members being spaced apart so as to be attached to respectively spaced apart seat legs and the adapter base being attached optionally to three replacement seats or to two replacement seats and a console.

11. A method of seat conversion for Ford Transit T130 and T140 vans having OEM seats and having axially extending OEM struts with cross-bars positioned on the struts to accept installation of OEM seat legs which attach to the struts at the cross bars and which attach to the OEM seats, the method retaining the OEM struts and cross-bars and retaining the OEM seat legs, the OEM seat legs each having a forward seat connection portion and a rear seat connection portion and the seat leg forward seat connection portion having an upward extending forward support member terminating in a forward flange portion defined by spaced apart forward mounting flange plates defining an axially extending front receiving space and the rear seat connection portion having an upward extending rear support member terminating in a rear flange portion defined by spaced apart rear mounting flange plates defining an axially extending rear receiving space; the front receiving space and the rear receiving space being axially aligned, the method comprising:

removing the OEM seats from respective OEM seat legs of the OEM seats;

providing an adapter base that has axial members having a vertical height defined by oppositely facing surfaces, said oppositely facing surfaces being spaced apart to fit into both the rear receiving space and the front receiving space respectively and being positioned to attach to the respective OEM seat legs and that has lateral members positioned to attach to a replacement seat, wherein the axial members are provided in a selected plurality so as to allow attachment to such respective OEM seat legs as to allow selection of one, two or three replacement seats and the lateral members are optionally of such length extending laterally to allow selection of one, two or three replacement seats;

whereby the conversion retains robust OEM design for floor attachment and seat legs and the provided adapter base can be varied within a specific design concept that can be varied in the length of lateral members and the number of axial members for the selected one, two or three replacement seats.

12. A method as in claim 11 wherein the conversion optionally allows installation of consoles or trays.

* * * * *